(12) United States Patent
Aksamija et al.

(10) Patent No.: US 12,435,889 B2
(45) Date of Patent: Oct. 7, 2025

(54) FACADE SYSTEM FOR THERMALLY CONDITIONING BUILDINGS

(71) Applicant: The University of Massachusetts, Boston, MA (US)

(72) Inventors: Ajla Aksamija, Hadley, MA (US); Zlatan Aksamija, Hadley, MA (US)

(73) Assignee: THE UNIVERSITY OF MASSACHUSETTS, Boston, MA (US)

( * ) Notice: Subject to any disclaimer, the term of this patent is extended or adjusted under 35 U.S.C. 154(b) by 266 days.

(21) Appl. No.: 17/871,130

(22) Filed: Jul. 22, 2022

(65) Prior Publication Data
US 2023/0048762 A1    Feb. 16, 2023

Related U.S. Application Data

(60) Provisional application No. 63/226,442, filed on Jul. 28, 2021.

(51) Int. Cl.
*F24F 5/00* (2006.01)
*E04B 1/76* (2006.01)
(Continued)

(52) U.S. Cl.
CPC ............ *F24F 5/0042* (2013.01); *E04B 1/762* (2013.01); *E04B 1/7654* (2013.01);
(Continued)

(58) Field of Classification Search
CPC ........ Y02B 10/20; H10N 10/17; H10N 10/13; Y02E 10/44; F24S 20/66; E04B 1/762; E04B 1/7654
See application file for complete search history.

(56) References Cited

U.S. PATENT DOCUMENTS

| | | | |
|---|---|---|---|
| 8,001,785 B2* | 8/2011 | Lee | H02K 7/1892 60/519 |
| 2005/0040152 A1* | 2/2005 | Koschenz | F28D 20/023 392/339 |

(Continued)

FOREIGN PATENT DOCUMENTS

| | | | |
|---|---|---|---|
| KR | 2021-0077895 | * | 12/2019 |
| WO | WO2020/0157809 | * | 7/2020 |

(Continued)

OTHER PUBLICATIONS

Aksamija et al., "Thermoelectric Facades: Modeling Procedure and Comparative Analysis of Energy Performance in Various Climate Conditions", Proceedings of the Architectural Research Centers Consortium (ARCC), 2022; 8 pages.
(Continued)

*Primary Examiner* — Brian E Glessner
*Assistant Examiner* — Daniel J Kenny
(74) *Attorney, Agent, or Firm* — CANTOR COLBURN LLP

(57) ABSTRACT

An architectural structure having: a wall of a room of the architectural structure; and a panel integrated into the wall, wherein the panel includes thermoelectric components (TECs) arranged as a TEC grid, thereby defining a radiant panel, wherein: the TECs, of the TEC grid, are thermally coupled to a common heat sink formed in part by an exterior surface of the wall; and the wall defines a wall surface area, the panel defines a panel surface area, and the panel surface area is between 5% and 20% of the wall surface area.

15 Claims, 16 Drawing Sheets

(51) Int. Cl.
*H02S 20/26* (2014.01)
*H10N 10/17* (2023.01)

(52) U.S. Cl.
CPC ............ *F24F 5/0089* (2013.01); *H02S 20/26* (2014.12); *H10N 10/17* (2023.02)

(56) References Cited

U.S. PATENT DOCUMENTS

| | | | | |
|---|---|---|---|---|
| 2011/0252814 | A1* | 10/2011 | Lee ............... | E04B 1/74 |
| | | | | 62/3.7 |
| 2016/0126438 | A1* | 5/2016 | Marc ............. | H10N 10/17 |
| | | | | 136/203 |
| 2017/0133572 | A1* | 5/2017 | Elsarrag ........ | E04B 1/76 |
| 2020/0157809 | A1* | 5/2020 | Kropac ......... | E04B 2/885 |

FOREIGN PATENT DOCUMENTS

| | | | | |
|---|---|---|---|---|
| WO | WO-2020152955 A1 * | 7/2020 | | |
| WO | WO-2021152955 A1 * | 8/2021 | ............... | G06T 7/70 |

OTHER PUBLICATIONS

Aksamija, A. et al., "Novel Active Facade Systems and Their Energy Performance in Commercial Buildings: Impact of Thermo-electric Materials on Heating and Cooling in Different Climates", Proceedings of the Facade World Congress, Oct. 10-12, 2022; 15 pages.

* cited by examiner

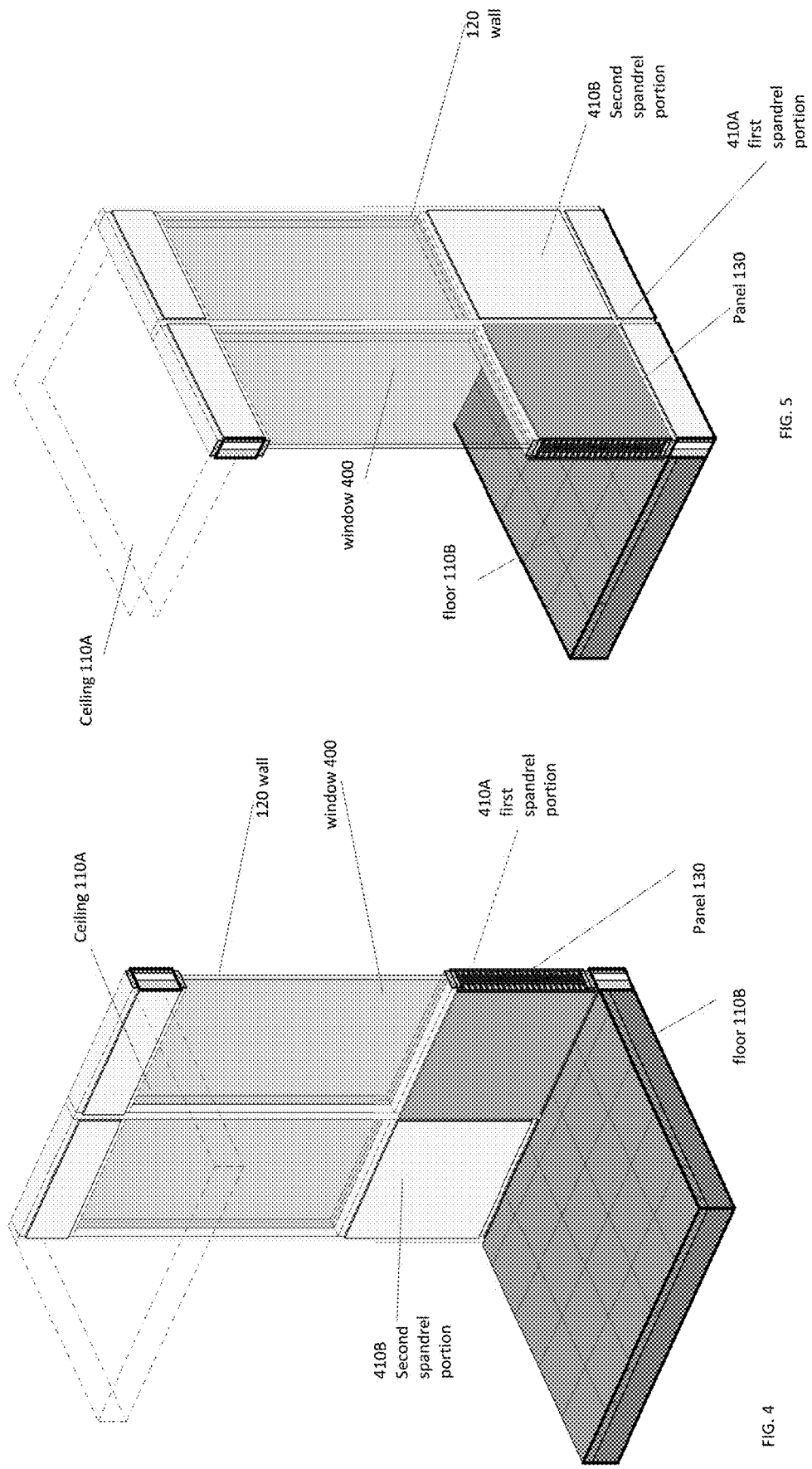

FACADE SYSTEM FOR THERMALLY CONDITIONING BUILDINGS

CROSS-REFERENCE TO RELATED APPLICATIONS

This application claims the benefit of U.S. Provisional Patent Application No. 63/226,442 filed Jul. 28, 2022, which is incorporated herein by reference in its entirety.

BACKGROUND

The embodiments herein relate to facade systems and more specifically to a facade system for localized, radiant thermal conditioning of buildings.

High demand for energy used for heating, ventilation, and air conditioning leads to significant amount of carbon dioxide emissions. According to the U.S. Department of Energy, 15% of global electricity is consumed by various refrigeration and air conditioning processes, and 46% of the energy used in household and commercial buildings is attributed to heating, ventilation and air-conditioning (HVAC) systems in 2011 (DOE, 2011). Given the high energy usage and inefficiencies found in conventional HVAC systems, new heating and cooling sources are needed in order to reduce buildings' carbon footprint. Moreover, integration of different building systems, particularly building envelope and HVAC, are essential for high-performance buildings.

BRIEF SUMMARY

Disclosed is an architectural structure, including: a wall of a room of the architectural structure; and a panel integrated into the wall, wherein the panel includes thermoelectric components (TECs) arranged as a TEC grid, thereby defining a radiant panel, wherein: the TECs, of the TEC grid, are thermally coupled to a common heat sink formed in part by an exterior surface of the wall; and the wall defines a wall surface area, the panel defines a panel surface area, and the panel surface area is between 5% and 20% of the wall surface area.

In addition to one or more of the aspects of the structure, the wall defines a panel aperture, and the panel is disposed within the panel aperture.

In addition to one or more of the aspects of the structure, the wall defines a wall exterior surface and a wall interior surface that are depthwise spaced apart from each other; the panel defines a panel interior surface and a panel exterior surface that are depthwise spaced apart from each other, wherein: the wall exterior and interior surfaces and the panel exterior and interior surfaces are parallel to each other, and the panel exterior surface is flush with, or continuous with, the wall exterior surface to define the common heat sink for the TEC grid.

In addition to one or more of the aspects of the structure, a panel depth of the panel is greater than a wall depth of the wall so that the panel interior surface is depthwise spaced apart from the wall interior surface.

In addition to one or more of the aspects of the structure, the panel defines a panel sandwich structure formed of a plurality of panel layers that are parallel to each other, wherein the TEC grid is a center panel layer located at or near a panel depthwise center of the panel, and the plurality of panel layers are defined by: the panel exterior surface and the panel interior surface, which define respective first and second heat sink panels; first and second sets of heat fins, which are respectively coupled to the first and second heat sink panels; first and second heat fin caps, which are respectively coupled to the first and second sets of heat fins; and first and second conductors, which are respectively coupled between the first and second heat fin caps and the TEC grid, wherein a thermal conductive circuit is defined between the panel exterior and interior surfaces, the first and second sets of heat fins, and the first and second heat fin caps.

In addition to one or more of the aspects of the structure, the TEC grid includes a plurality of rows and columns of the TECs that are spaced apart from each other, wherein the TECs are each thermally connected to each other via the thermal conductive circuit.

In addition to one or more of the aspects of the structure, the TEC grid is aligned with a wall depthwise center of the wall.

In addition to one or more of the aspects of the structure, the first set of heat fins have a first fin depth; and the second set of heat fins have a second fin depth that is less than the first fin depth.

In addition to one or more of the aspects of the structure, the first and second heat sink panels are, respectively, first and second rainscreens formed of aluminum; and the first and second sets of heat fins are formed of aluminum.

In addition to one or more of the aspects of the structure, the wall defines a wall sandwich structure formed of a plurality of wall layers that are parallel to each other, and the plurality of wall layers are defined by: the wall interior surface, which is a first sheathing layer; the wall exterior surface, which is at least in part formed of the same material as the panel exterior surface, and at least in part defines the common heat sink for the TEC grid; a first insulation layer, which is disposed against the wall interior surface; a second sheathing layer, which is disposed against the first insulation layer; and a second insulation layer, which is disposed against the second sheathing layer, wherein: a first airgap layer is defined between the wall interior surface and the first insulation layer; and a second airgap layer is defined between the second insulation layer and the wall exterior surface.

In addition to one or more of the aspects of the structure, the first and second sheathing layers are gypsum.

In addition to one or more of the aspects of the structure, the structure includes supports for the wall exterior surface that extend depthwise between the second insulation layer and the wall exterior surface.

In addition to one or more of the aspects of the structure, the first insulation layer is batting and the second insulation layer is rigid foam, wherein: the first insulation layer has a first insulation layer depth that is substantially three times a second insulation layer depth of the second insulation layer; and a second airgap depth defined between the second insulation layer and the wall exterior surface is substantially the same as the second insulation layer depth.

In addition to one or more of the aspects of the structure, a third insulation layer surrounds an outer boundary of the panel, depthwise between and extending perpendicularly to the wall exterior and interior surfaces, to thermally isolate the panel from the wall interior surface, the first insulation layer, the second sheathing layer, the second insulation layer, and the first and second airgap layers.

In addition to one or more of the aspects of the structure, the third insulation layer is rigid foam having a thickness that is half of the second insulation layer depth.

In addition to one or more of the aspects of the structure, the structure includes a power source, controllable by a thermostat, connected to the first and second conductors to control a heating direction of the TEC grid.

In addition to one or more of the aspects of the structure, the wall includes a window that extends from a ceiling to a spandrel wall portion that extends from a floor of the room; and the panel is disposed in the spandrel wall portion.

In addition to one or more of the aspects of the structure, the wall includes a window; and a photovoltaic panel is disposed on an external surface of the wall and configured to direct power to the radiant panel.

In addition to one or more of the aspects of the structure, the wall includes a window; and the panel is located on one or both sides of the window, wherein the common heat sink extends outwardly, away from an external surface of the wall, to form a shade.

Disclosed is a method of thermally controlling a room of an architectural structure, including: determining, by a thermostat, that a room activation condition has been reached; and activating, by the thermostat, a panel that includes thermoelectric components (TECs) arranged as a TEC grid, thereby define a radiant panel, in response to determining that the room activation condition is reached, wherein the panel is integrated into the wall, and wherein: the TECs, of the TEC grid, are thermally coupled to a common heat sink formed by a surface of the wall; and the wall defines a wall surface area, the panel defines a panel surface area, and the panel surface area is between 5% and 20% of the wall surface area.

BRIEF DESCRIPTION OF THE DRAWINGS

The present disclosure is illustrated by way of example and not limited in the accompanying figures in which like reference numerals indicate similar elements.

FIG. 4 is an interior view of a room configured with a curtain wall and a radiant panel, according to an embodiment;

FIG. 5 is an exterior view of the room of FIG. 4;

DETAILED DESCRIPTION

Figure 1:
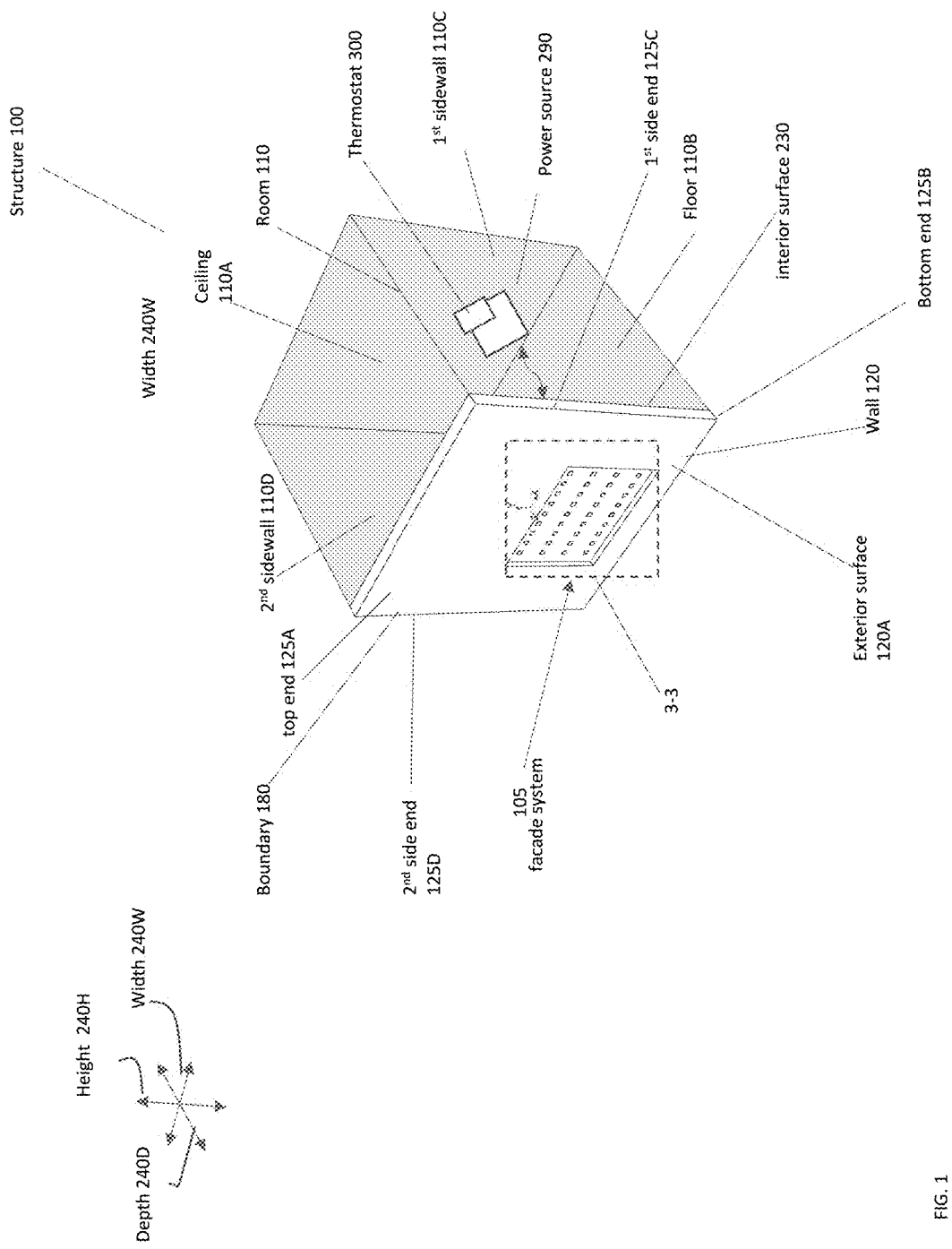
FIG. 1 is a schematic illustration of a room of a building utilizing a disclosed radiant panel.
Figure 2:
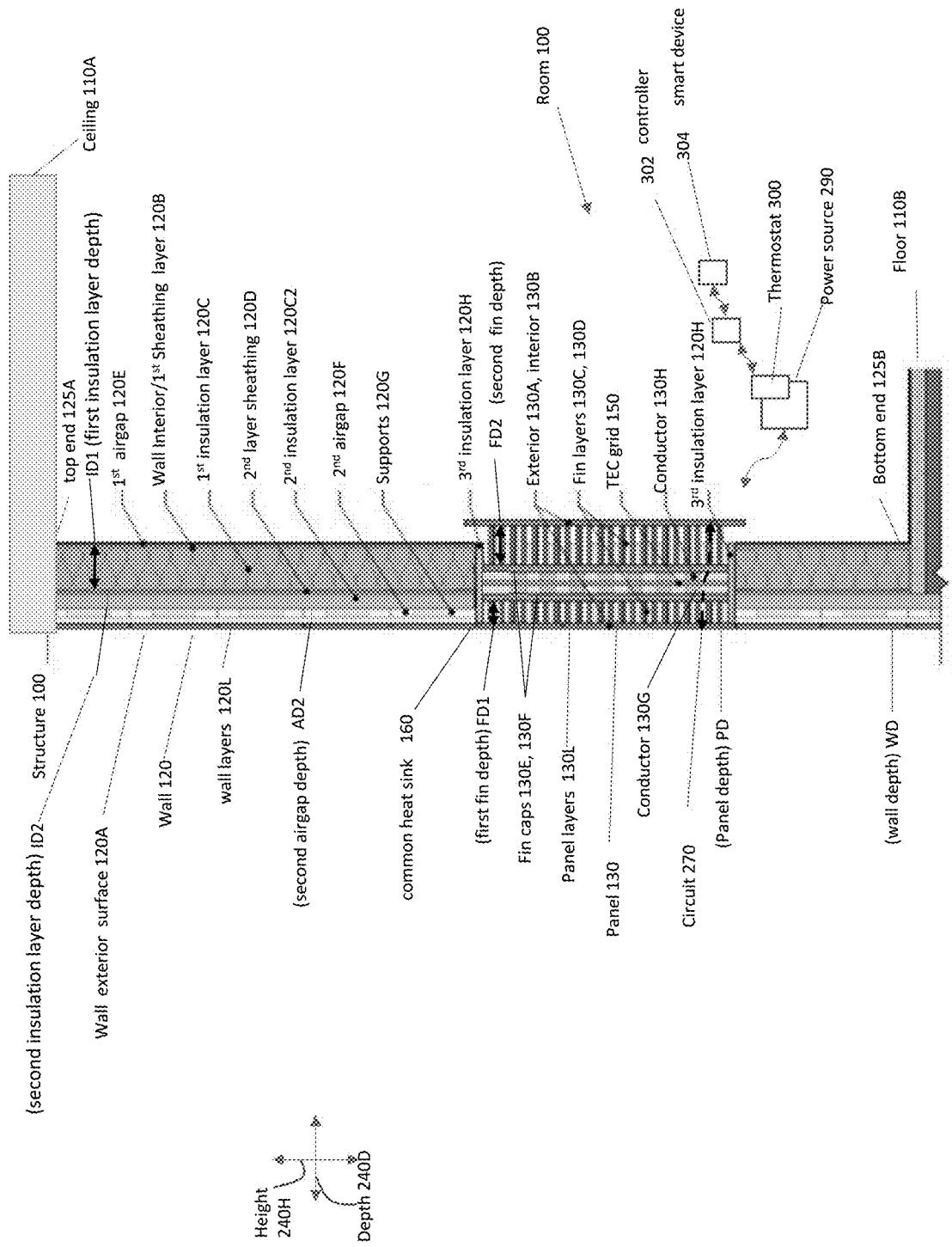
FIG. 2 is a cross-sectional illustration of an exterior wall of the building.
Figure 3:
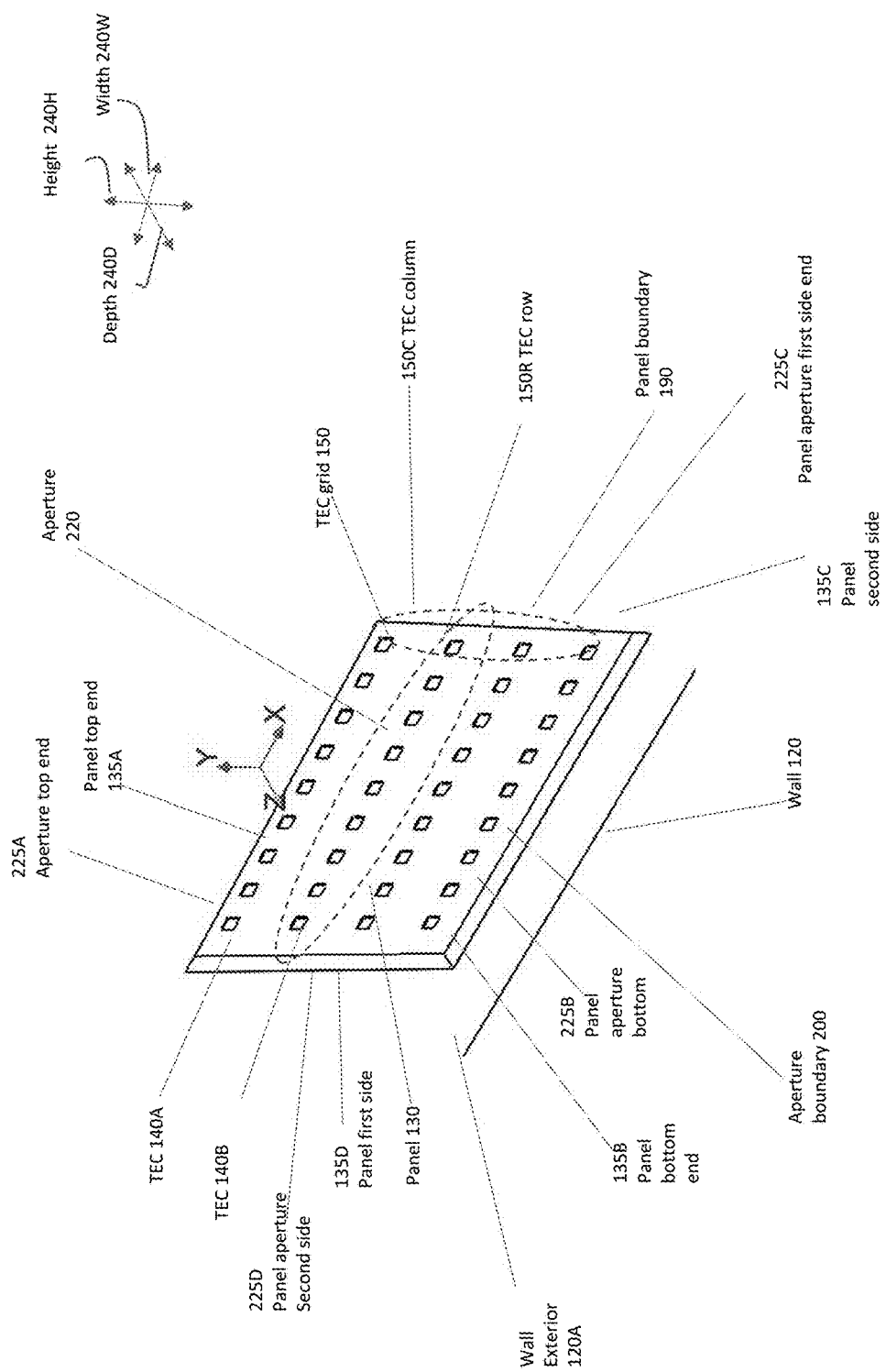
FIG. 3 is section 3-3 of FIG. 1.

Turning to FIGS. 1-3, disclosed is an architectural structure, e.g., residential or commercial building (hereafter a building) 100. The building 100 includes at least one room 110. The building 100 includes a wall 120 of the room 110, which is an exterior wall. The wall exterior surface 120A is an exterior facade of the building 100. The building 100 includes a facade system 105 for thermally conditioning the room. Specifically, the wall 120 includes a panel 130, which is a radiant panel, integrated into it. The panel 130 includes thermoelectric components (TECs) 140A, 140B, (FIG. 3), generally referenced as 140, arranged as a TEC grid 150. The panel 130 is configured to provide radiant heating in a heating mode and absorb heat in a cooling mode. The TECs 140 of the TEC grid 150 are thermally coupled to a common heat sink 160 (FIG. 2) formed by a wall exterior surface 120A or portion thereof.

The wall 120 defines a wall surface outer (e.g., perimeter) boundary 180 (FIG. 1), which defines a wall surface area. The panel 130 defines a panel outer (e.g., perimeter) boundary 190 (FIG. 3), which defines a panel surface area. The panel surface area is between 5% and 20% of the wall surface area. In one example, the panel surface area is 15% of the wall surface area.

In one embodiment, the wall 120 defines a panel aperture boundary 200 (FIG. 3), which defines a panel aperture 210 (FIG. 3). The size and shape of the panel aperture 210 is complementary to the panel outer boundary 190. The panel 130 is disposed within the panel aperture 220.

The wall 120 defines a wall interior surface 120B (FIG. 2) and the wall exterior surface 120A that are depthwise (e.g., along depth axis 240D) spaced apart from each other. The panel 130 defines a panel exterior surface 130A and a panel interior surface 130B (FIG. 2) that are depthwise spaced apart from each other.

The wall exterior and interior surfaces 120A, 120B and the panel exterior and interior surfaces 130A, 130B are parallel to each other. The panel exterior surface 130A is flush with the wall exterior surface 120A to define the common heat sink for the TEC grid 150. The panel exterior surface 130A may be continuous (e.g., unitary) with the wall exterior surface 120A and/or may be made of a same conductive material and fit within a complementary shaped cutout defined in the wall exterior surface 120A (see FIG. 7). A panel depth PD of the panel 130 is greater than a wall depth WD of the wall 120 so that the panel interior surface 130B is depthwise spaced apart from the wall interior surface 230, e.g., due to the difference in depth between the wall and panel.

The panel 130 defines a panel sandwich structure formed of a plurality of panel layers, generally referenced as 130L (FIG. 2). The panel layers are parallel to each other and include and are parallel to the panel exterior and interior surfaces 130A, 130B.

The plurality of panel layers 130L include the panel exterior and interior surfaces 130A, 130B, which respectively are first and second heat sink panels. First and second sets of heat fins 130C, 130D are included, which are respectively coupled to the panel exterior and interior surfaces 130A, 130B (i.e., the first and second heat sink panels). First and second heat fin caps 130E, 130F are included, which are respectively coupled to the first and second sets of heat fins 130C, 130D. First and second conductors 130G, 130H are included, which are respectively coupled between the first and second heat fin caps 130E, 130F and the TEC grid 150. The TEC grid 150 is a center panel layer located at or near a panel depthwise center of the panel 130.

A thermal conductive circuit 270 is defined between the panel exterior and interior surfaces 130A, 130B, the first and second sets of heat fins 130C, 130D, and the first and second heat fin caps 130E, 130F. The circuit 270 thermally couples the TEC grid 150, and all TECs 140 thereof, to the panel exterior surface 130A. The panel and wall are configured to conduct heat so that the circuit 270 thermally couples the TEC grid to the wall exterior surface 120A. That is in some embodiments the panel exterior surface and wall exterior surface are continuous or contact each other and are the same material. For example, the panel exterior surface may be aluminum, and the wall exterior surface may be aluminum cladding, and these surfaces may be disposed against each other so as to be thermally coupled upon installation of the panel 130. It is to be appreciated that other conductive materials may be utilized for the panel exterior surface and/or wall exterior surface in accordance with the disclosed embodiments.

The TEC grid 150 includes a plurality of rows generally labeled as 150R and columns generally labeled 150C of the TECs 140 that are spaced apart from each other. For example, the rows 150R are spaced apart in the heightwise direction (along height axis 240H) and the columns are spaced apart in the widthwise direction (along width axis 240W). The TECs 140 are each thermally connected to each other via the thermal conductive circuit 270.

In one embodiment, the plurality of panel layers 260 are configured so that the TEC grid 150 is aligned with a wall depthwise center of the wall 120. In one embodiment the first set of heat fins 130C have a first fin depth FD1 (otherwise referred to as a depthwise span) along the depthwise direction. The second set of heat fins 130D have a second fin depth FD2 along the depthwise direction that is less than the first fin depth FD1. In an embodiment, the panel exterior and interior surfaces 130A, 130B (i.e., the first and second heat sink panels) are, respectively, first and second rainscreens formed of aluminum. The first and second sets of heat fins 13C, 13D are formed of aluminum. It is to be appreciated that other conductive materials may be utilized for the rainscreens and/or heat fins in accordance with the disclosed embodiments. The wall 120 defines a wall sandwich structure formed of a plurality of wall layers generally referenced as 120L that are parallel to each other and include and are parallel to the wall exterior and interior surfaces 120A, 120B. The plurality of wall layers 120L are defined by the wall exterior surface 120A and the wall interior surface 120B. The wall interior surface 120B is a first sheathing layer. The wall exterior surface 120A is at least in part formed of the same material as the panel exterior surface 130A, and at least in part defines the common heat sink 160 for the TEC grid 150. The plurality of wall layers 120L are further defined by a first insulation layer 120C, which is disposed against the wall interior surface 120B, and a second sheathing layer 120D, which is disposed against the first insulation layer 120C. The plurality of wall layers 120L are further defined by a second insulation layer 120C2, which is disposed against the second sheathing layer 120D. A first airgap layer 120E is defined between the wall interior surface 120B and the first insulation layer 120C. A second airgap layer 120F is defined between the second insulation layer 120C2 and the wall exterior surface 120A.

The wall interior surface 120B (i.e., the first sheathing layer) and the second sheathing layer 120D may be gypsum. It is to be appreciated that other materials may be utilized for the sheathing layers in accordance with the disclosed embodiments. Supports (or wall mounts) 120G for the wall exterior surface 120A extend depthwise between the second insulation layer 120C2 and the wall exterior surface 120A.

The first insulation layer 120C is batting and the second insulation layer 120C2 is rigid foam. The first insulation layer 120C has a first insulation layer depth ID1 that is substantially three times a second insulation layer depth ID2 of the second insulation layer 120C2. A second airgap depth AD2, defined between the second insulation layer 120C2 and the wall exterior surface 120A, is substantially the same as the second insulation layer depth ID2.

A third insulation layer 120H surrounds the panel outer boundary (or panel boundary) 190, depthwise between and extending perpendicularly to the wall exterior and interior surfaces 120A, 120B. The third insulation layer 120H thermally isolates the panel 130 from the wall interior surface 230, the first insulation layer 120C, the second sheathing layer 120D, the second insulation layer 120C2, and the first and second airgap layers 120E, 120F. The third insulation layer 120H is rigid foam having a thickness that is half of the second insulation layer depth ID2.

A power source 290, controllable by a thermostat 300 (or other related type of sensor), is connected to the first and second conductors 130G, 130H, e.g., by a wired connection (embodiments of such connections are provided below). This enables controlling of a heating direction (or heating mode) of the TEC grid 150. The thermostat may be triggered based on room conditions, such as temperature and humidity. The thermostat may also be triggered by a controller 302 in the thermostat receiving instructions over a wireless connection (embodiments of such connections are provided below) with a smart device 304. The control systems can also be operated by building users, to override set-point temperatures used by the thermostat.

In an embodiment, the wall 120 extends between a wall top end 125A and a wall bottom end 125B that are heightwise spaced apart from each other. The wall 120 extends between a wall first side end 125C and a wall second side end 125D that are widthwise spaced apart from each other. The wall outer boundary 180, which defines the wall surface area, is defined between the wall top and bottom ends 125A, 125B and the wall first and second side ends 125C, 125D.

The panel 130 extends between a panel top end 135A and a panel bottom end 135B that are heightwise spaced apart from each other. A panel first side end 135C and a panel second side end 135D are widthwise spaced apart from each other. The panel outer boundary 190 that defines the panel surface area, is defined between the panel top and bottom ends 135A, 135B and the panel first and second side ends 135C, 135D.

As indicated, the panel aperture boundary 200, that defines the panel aperture 220, is sized to complement the panel outer boundary 190. The panel aperture boundary 200 is defined by a panel aperture top end 225A and a panel aperture bottom end 225B that are heightwise space apart from each other. A panel aperture first side end 225C and a panel aperture second side end 225D are widthwise spaced apart from each other.

As shown in FIG. 1, the wall top end 125A intersects a ceiling 110A of the room 110. The wall bottom end 125B intersects a floor 110B of the room 110. The wall first side end 125C intersects a first sidewall 110C of the room 110. The wall second side end 125D intersects a second sidewall 110D of the room 110.

Additional embodiments are disclosed below, where like number represent like aspects of the above disclosed embodiments.

Turning to FIGS. 4 and 5 the wall 120 defines a facade system that is a curtain wall. The curtain wall includes insulated glazing unit (which may include an operable window) 400 that extends downwardly from the ceiling 110A (or ceiling level) to a first vertical wall location intermediate the ceiling level and a floor level, at a floor 110B of the room. A spandrel wall (or spandrel) 410 extends upwardly from the floor 110B (or floor level) to the first vertical wall location, to the window 400. The spandrel 410 is opaque and includes a first spandrel portion 410A which is, or includes, the panel 130. The spandrel 410 includes a second spandrel portion 410B that is utilized for concealing mechanical implements and a floor slab for the room 110 and more generally for utilities of the building 100 in typical fashion. The surface area of the wall is again calculated by the area between the ceiling and the floor and between opposing sides of the wall, including the window and spandrel portions. The ratio of the size of the panel to the wall is configured as indicated above. The exterior surface of the spandrel 410 may be aluminum or other conductive material, e.g., to function in part as a conductor for the panel 130 by being in thermal communication with the panel 130.

Figure 7:
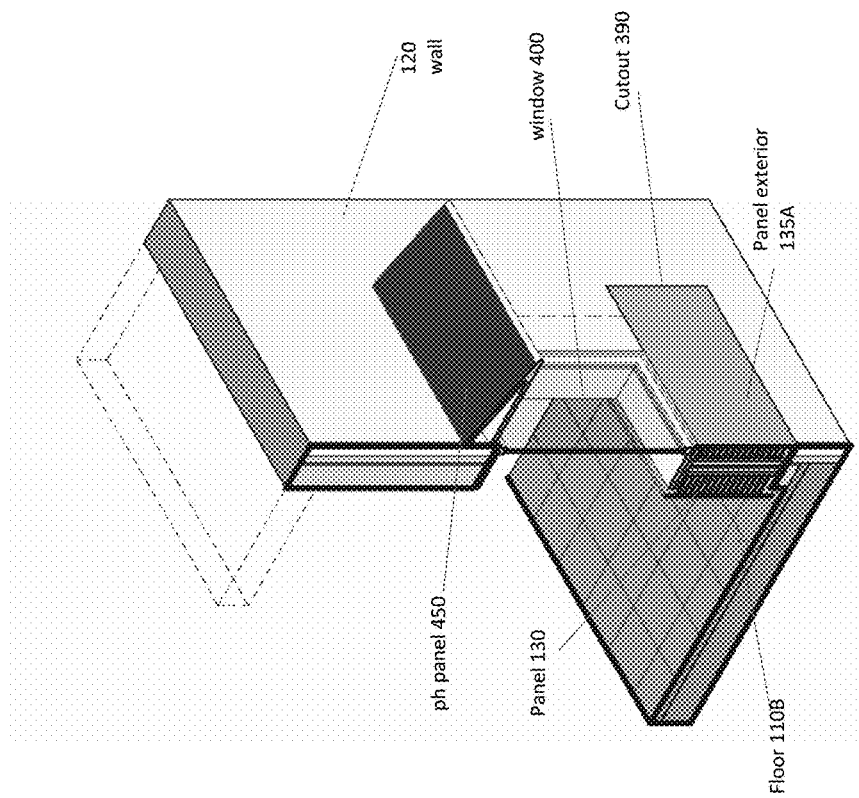
FIG. 7 is an exterior view of the room of FIG. 6.
Figure 6:
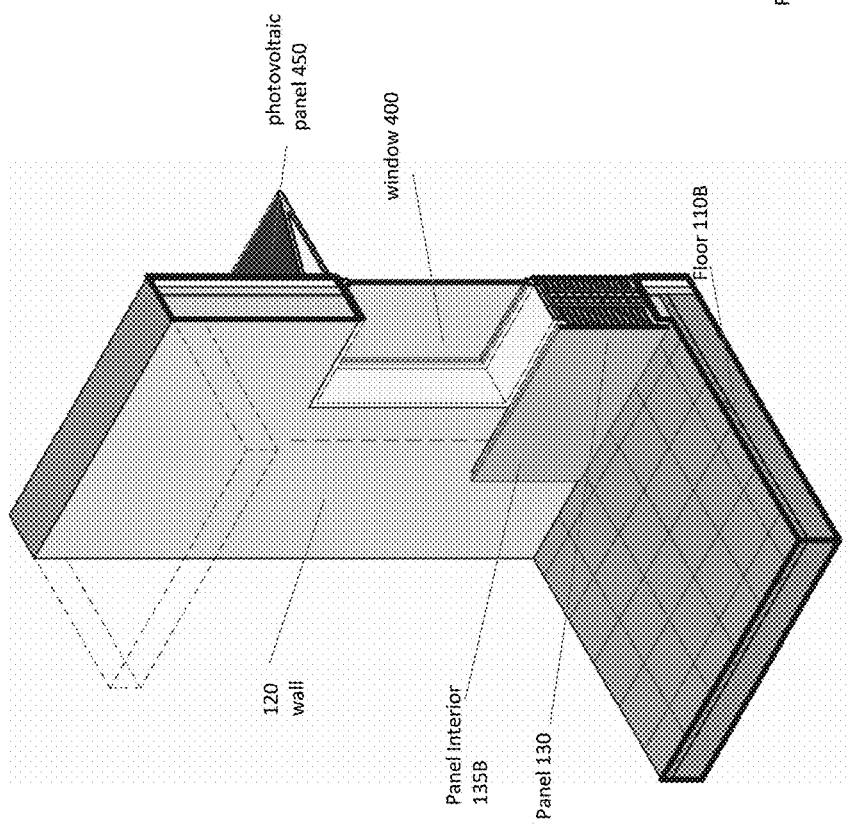
FIG. 6 is an interior view of a room configured with a window, a radiant panel and a photovoltaic panel, according to an embodiment.

Turning to FIGS. 6 and 7, the wall 120 includes a window 400 that is shown as being smaller than the window of FIGS. 4 and 5 (though this sizing is not material), and the panel 130 is installed in the wall 120, between the window 400 and floor 110B. In these figures, the panel exterior and interior surfaces 130A, 130B are shown, and the panel exterior surface 130A may or may not be integral with the wall exterior surface 120A. For example, in a situation where the panel 130 is retrofitted in the wall 120, it may be unfeasible for the panel exterior surface 130A to be integral with the wall exterior surface 120A. In such instance a complementary shaped cutout 390 may defined in the wall exterior surface 120A to receive the panel exterior surface 130A. A photovoltaic panel 450 is provided and attached to the wall exterior surface 120A, as shown vertically above and vertically adjacent to the window 400. As shown, the photovoltaic panel 450 is shaped and located to function as a window awning or shade. The photovoltaic panel 450 is configured to store enough energy to power the panel 130 as needed or to supplement other available power. In its illustrated location, the photovoltaic panel 450 also functions as a horizontal shade for the window 400.

Figure 9:
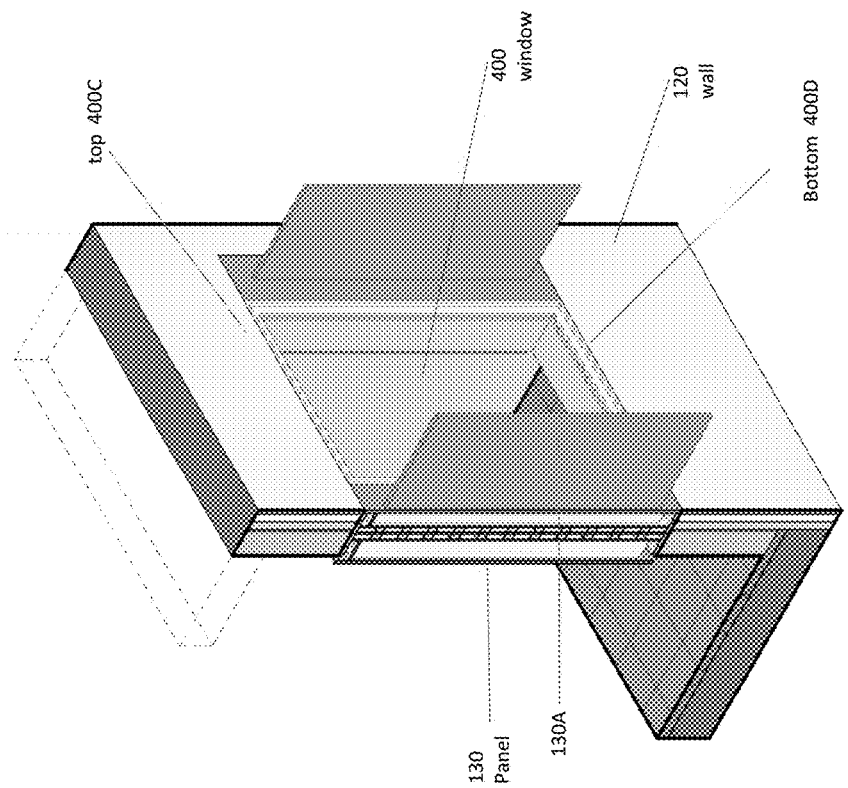
FIG. 9 is an exterior view of the room of FIG. 8.
Figure 8:
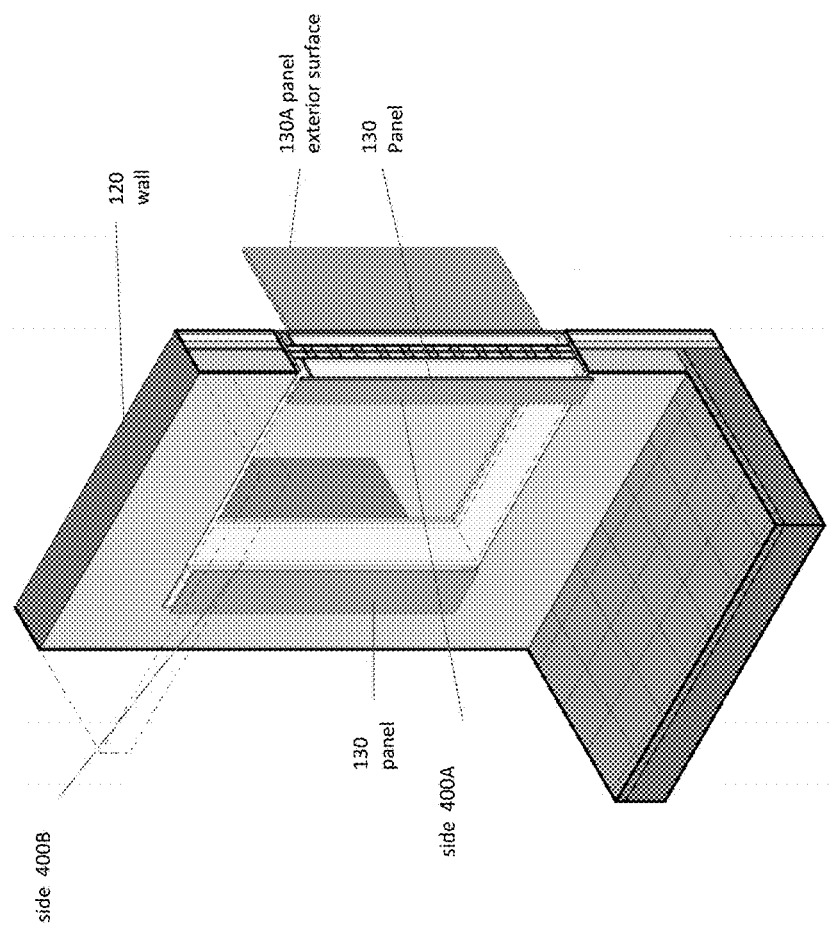
FIG. 8 is an interior view of a room configured with a window, a radiant panel and a heat sink of the radiant panel that is a vertical shade.

Turning to FIGS. 8 and 9, the wall 120 includes a window 400 that is shown as being smaller than the window of FIGS. 4 and 5 (though this sizing is not material). The panel 130 is installed on one or both vertical sides 400A, 400B of the window 400 in the wall 120. The panel 130 is shown as extending alongside the window 400 so that it is level with the top and bottom 400C, 400D of the window 400, though this is not a requirement. In this embodiment, panel exterior surface 130A extends outwardly, away from the wall exterior surface 120A and define a vertical shade for the window.

Figure 10:
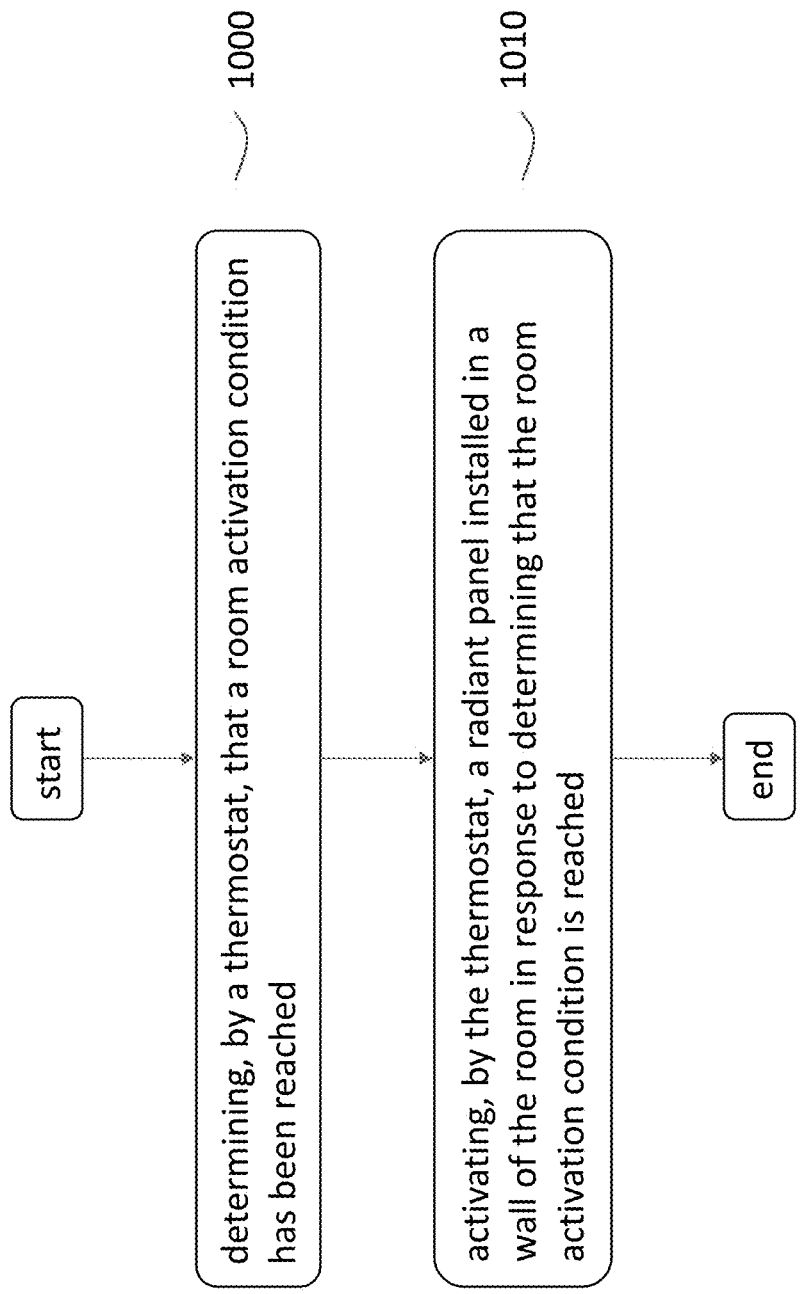
FIG. 10 is a flowchart showing a method of thermally conditioning a room.

Turning to FIG. 10, further disclosed is a method of thermally controlling an interior surface that is configured per any of the embodiments identified above. As shown in block 1000, the method includes determining, by the thermostat, that a room activation condition has been reached. As shown in block 1010, the method includes activating, by the thermostat, the radiant panel installed in the wall of the room in response to determining that the room activation condition is reached. In one embodiment, the activation condition may include a high or low temperature, or a sensed humidity level. Another trigger for the thermostat may be receiving instructions to activate via a wireless connection with a smart device, such as a mobile phone.

The above embodiments provide a thermal radiant system that may meet the high demand for energy used for heating, cooling, and air conditioning, avoiding the generation of carbon dioxide emissions. The embodiments provide for thermally conditioning a room or other internal space more efficiently than conventional heating and cooling systems. Moreover, the embodiments are able to be integrated with different building systems, within a building envelope, to meet heating and cooling needs that are essential for high-performance buildings.

Example 1

According to a first example, the embodiments of the thermoelectric (TE) facade systems shown in the companying figures and discussed in the above disclosure (hereinafter referred to generally as the disclosed facade systems or a TE system or a TE facade, where TE means thermoelectric components or thermoelectric materials) were considered in single office space environment, e.g., an isolated office space in a building, and simulations were performed. The inventors considered fifteen (15) different climate zones, from Miami to Alaska, and compared performance of the disclosed facade systems to conventional HVAC systems.

With the first example, a research study presented a methodology for simulating energy performance of the disclosed facade systems. The disclosed facade systems, as indicated above, can be used for localized heating and cooling in buildings. Simulations were performed to investigate impacts of TEs on buildings' energy performance by comparing them against a conventional HVAC system. The study was carried out by modeling a typical office space in IDA ICE software program (IDA Indoor Climate and Energy is a Building performance simulation software developed by EQUA Simulation AB), with an area of 3×3 m2 (10×10 ft2) and included one exterior wall (with an incorporated window), three adiabatic interior walls, a floor, and a ceiling. Simulations were performed for 15 different climates (climate zones 1A to 8). To simulate TE system's energy performance, an electric radiator, with characteristics that most closely matched that of the TE system, was used. This included assigning a certain area to the radiator and calculating its rated input power based on the climate condition. Based on conducted research, 15% wall coverage was determined as the optimum area for heating and cooling production. Therefore, area of the electric radiator was assigned as 1.35 m2 (15 ft2). Given that the TE system's performance and output depend on the temperature difference between the building's internal and external environments, this was separately calculated for each climate zone and used for modeling energy performance of the TE system. Energy modeling results showed a reduction in energy consumption and improved performance of TE facade systems, compared to conventional HVAC systems. Energy Usage Intensity (EUI) comparison showed that the TE system exhibited improved performance in all climate zones. The results concluded that TE materials are promising intelligent components that can be used in facade assemblies for heating and cooling purposes.

More specifically, in the research study, the objectives were:

To evaluate energy performance of TE facade systems in various climatic conditions, and To compare their energy consumption against a conventional HVAC system.

The study was conducted by modeling a typical office in IDA ICE software program, where a single office space was considered. Variables included HVAC system (TE facade as an experimental system and a VAV (variable air volume) as a conventional system), and climate conditions. Fifteen different climate zones were considered, as shown in the following table showing selected climate zones/regions and representative cities used for the energy modelling.

| Selected climate zones/regions and representative cities used for the energy modelling | | | |
|---|---|---|---|
| Climate zone | City | Zone | Region |
| 1A | Miami, FL | Very hot | Moist |
| 2A | Houston, TX | Hot | Moist |
| 2B | Phoenix, AZ | Hot | Dry |
| 3A | Memphis, TN | Warm | Moist |
| 3B | El Paso, TX | Warm | Dry |
| 3C | San Francisco, CA | Warm | Marine |
| 4A | Baltimore, MD | Mixed | Moist |
| 4B | Albuquerque, NM | Mixed | Dry |
| 4C | Salem, OR | Mixed | Marine |
| 5A | Chicago, IL | Cool | Moist |
| 5B | Boise, ID | Cool | Dry |
| 6A | Burlington, VT | Cold | Moist |
| 6B | Helena, MT | Cold | Dry |
| 7 | Duluth, MN | Very cold | N/A |
| 8 | Fairbanks, AK | Subarctic | N/A |

The office space had an area of 3×3 m2 (10×10 ft2) and included one exterior wall (with an incorporated window), three adiabatic interior walls, a floor, and a ceiling. The internal loads included one occupant, constant equipment and lighting loads, which were identical in all the developed models.

Thermoelectric Modeling for Example 1

To model the TE system in IDA ICE software program, 15% wall coverage with TE modules was treated as an electric radiator, covering 1.35 m2 (15 ft2) of the building envelope. Due to inability of the existing energy modelling software programs to model and simulate TE systems, the radiant system was used as a representative system. To model the TE system and simulate its impacts on energy performance, characteristics that most closely matched that of the TE system were assigned to the electric radiator, including a certain area (in respect to the building envelope's total area) and a calculated input power. Since TEs' performance and output depend on the temperature difference between the building external and internal environments, the input powers were calculated separately based on each climate zone. The indoor temperature was constantly kept at 21° C. (70° F.) and the maximum and minimum outdoor temperatures were extracted from the historical weather data, specific to each location. In the following table, power rating calculations for various climate zones are shown. This information was used to develop 30 different energy models, two for each climate zone, where the only differences between the models considered different HVAC type.

| External and internal temperature difference and the associated power rating values for TE system. | | | |
|---|---|---|---|
| Climate zone | Mean delta T ° C. (° F.) | Power rating per TE module (W) | Total power rating (W) |
| 1A | 15 (59) | 80 | 2,160 |
| 2A | 18 (64) | 78 | 2,106 |
| 2B | 21 (70) | 75 | 2,025 |
| 3A | 25 (77) | 70 | 1,890 |
| 3B | 22 (72) | 75 | 2,025 |
| 3C | 15 (59) | 80 | 2,160 |
| 4A | 25 (77) | 70 | 1,890 |
| 4B | 24 (75) | 70 | 1,890 |
| 4C | 25 (77) | 70 | 1,890 |
| 5A | 29 (84) | 63 | 1,701 |
| 5B | 27 (81) | 65 | 1,755 |
| 6A | 33 (91) | 55 | 1,485 |
| 6B | 30 (86) | 60 | 1,620 |
| 7 | 32 (90) | 57 | 1,539 |
| 8 | 34 (93) | 55 | 1,485 |

Results of Example 1

Results of the thirty simulations in IDA ICE program included monthly and annual energy performance, as well as Energy Usage Intensity (EUI) for each analyzed climate zone. Monthly energy data included lighting, equipment, HVAC auxiliary, electric cooling, electric heating, and fuel heating. Additionally, given that lighting and equipment types and schedules were identical in all simulation models, energy consumption data associated with them were eliminated from the comparisons. Therefore, in the comparative analysis of the energy performance results, HVAC auxiliary, electric cooling, and fuel heating energy performance were the only data taken into consideration.

Figure 11:
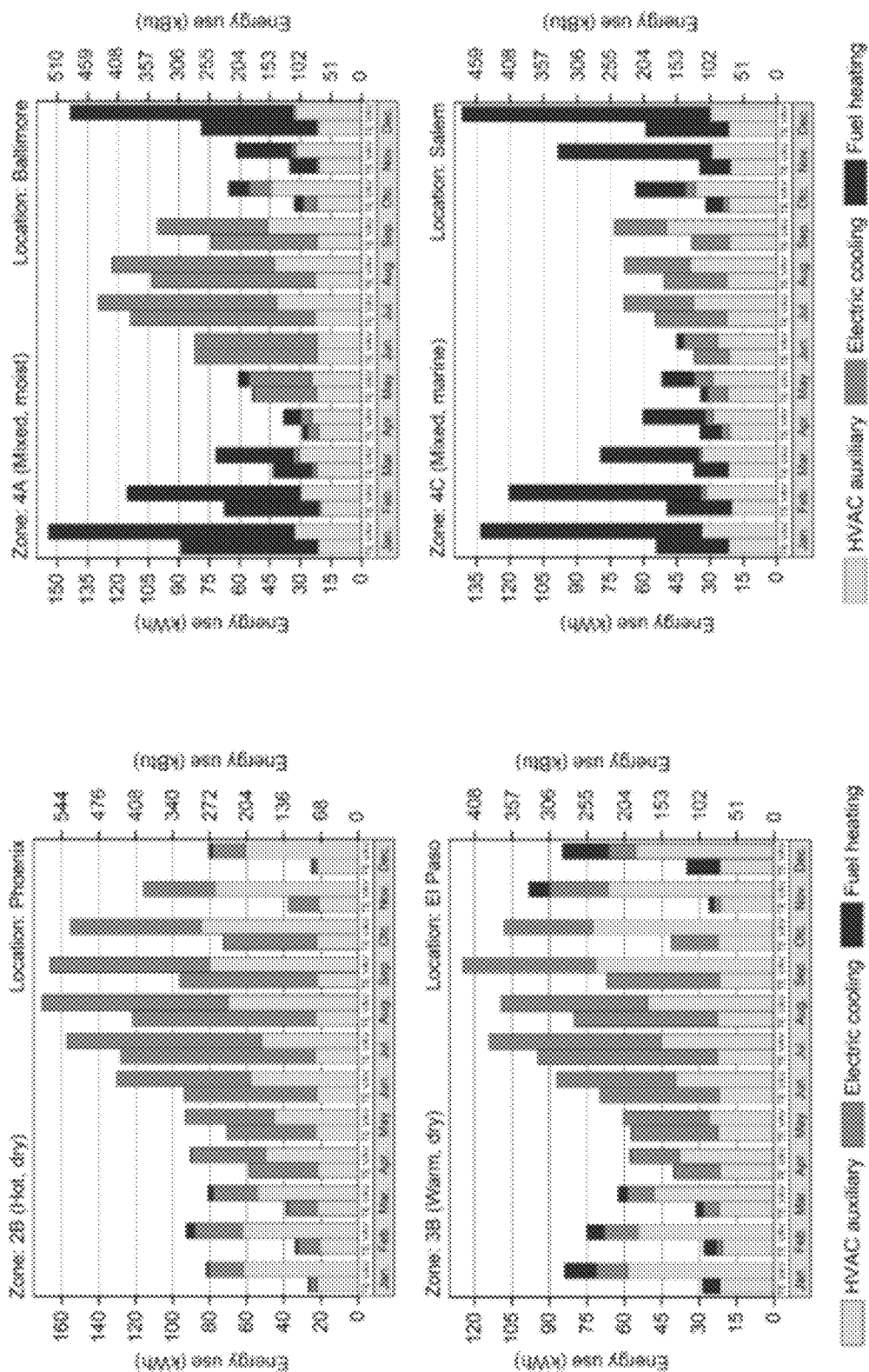
FIG. 11 shows TE vs. VAV monthly energy use in climate zones 2B (Phoenix), 3B (El Paso), 4A (Baltimore) and 4C (Salem)

Trend of the monthly energy use of TE system vs. that of VAV system was summarized by merging the fifteen climate zones into three categories: very hot to warm (1A to 3C), mixed (4A to 4C), and cool to subarctic (5A to 8). From each category, two zones/locations were selected to represent energy performance differences, as shown in FIGS. 11 and 12.

Results indicate that monthly energy consumption with the VAV system was always higher than for the IL facade system. Considering climate conditions (very hot to warm), higher amount of energy was needed for cooling purposes, compared to heating loads. Heating was only used during the coldest months of the year (January, February, March, November, and December), while electric cooling was predominant during the summer and fall months. Monthly energy usage of the two systems in mixed climates (zones 4A and 4C) was higher than for very hot to warm zones (zones 2B and 3B) due to higher heating loads. TE system showed a significant performance improvement compared to the conventional HVAC system, especially in heating modes.

Figure 12:
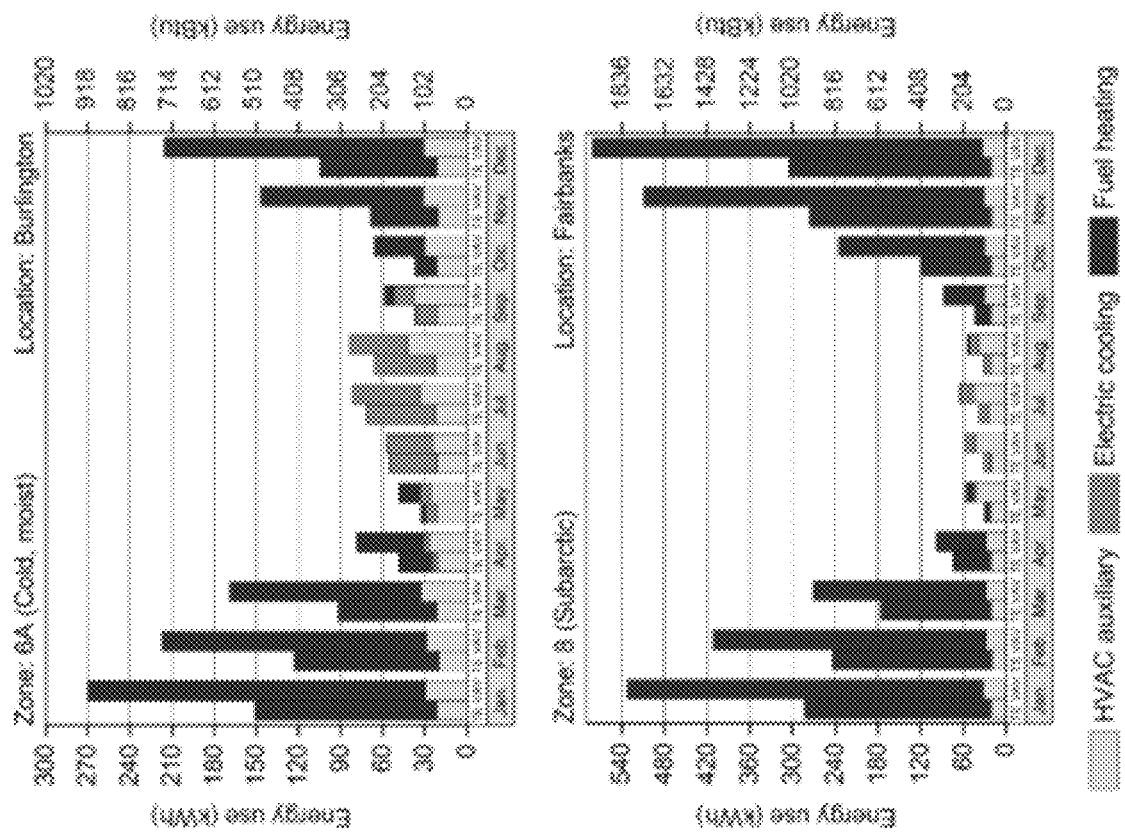
FIG. 12 shows TE vs. VAV monthly energy use in use in climate zones 6A (Burlington) and 8 (Fairbanks)

FIG. 12 shows results for monthly energy consumption in climate zones 6A and 8. TE system showed a much higher energy efficiency, specifically during coldest months. In this category (cold to subarctic), there was a significant reduction in monthly electricity use since most of the cooling loads were eliminated except during the hottest months of the year. Moreover, fuel usage for heating purposes was higher than that of the other two climate categories (very hot to warm and mixed), due to the much colder weather conditions.

Figure 13:
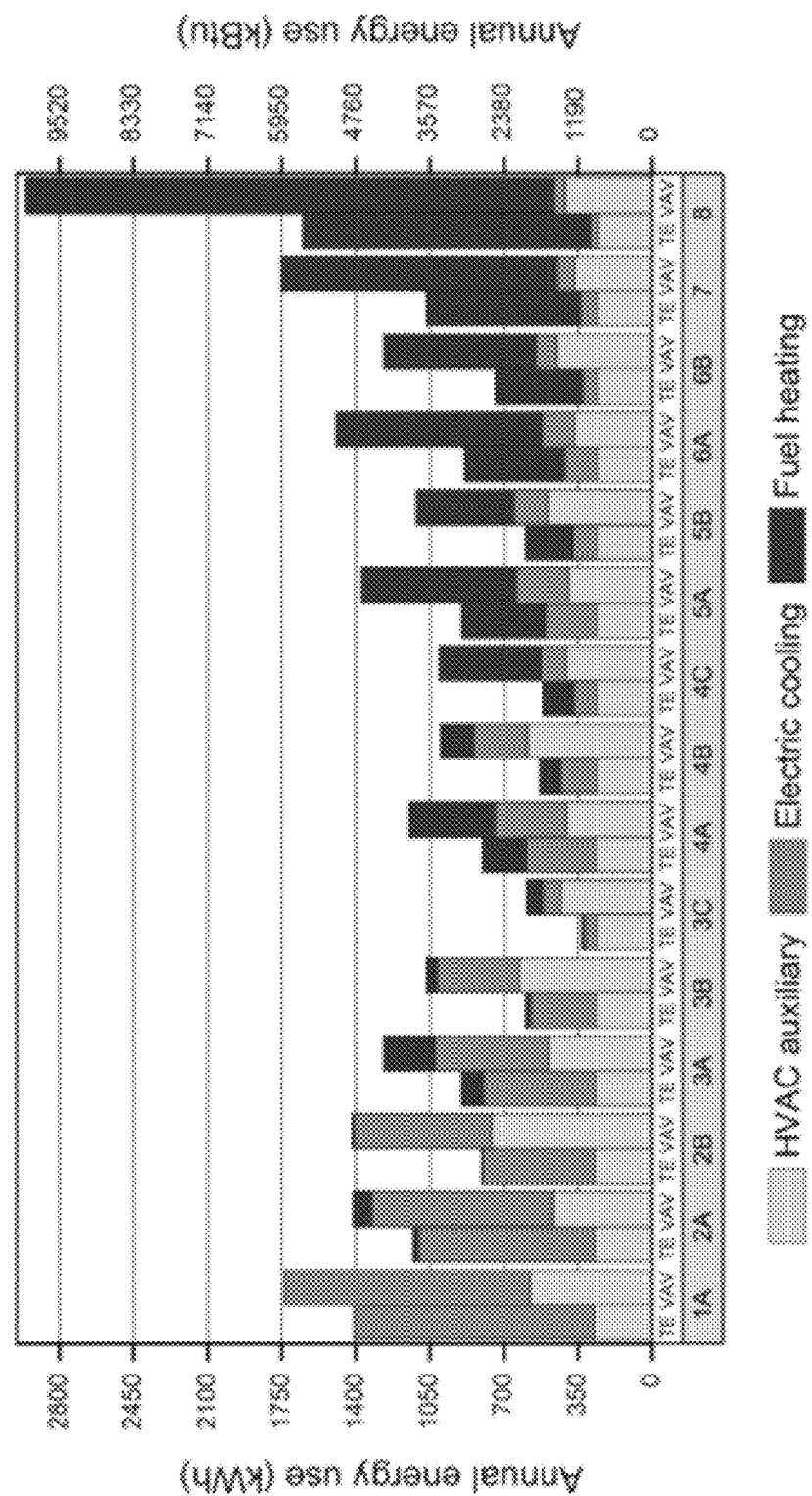
FIG. 13 shows Annual energy use comparison of TE vs. VAV system, in various climate zones.
Figure 14:
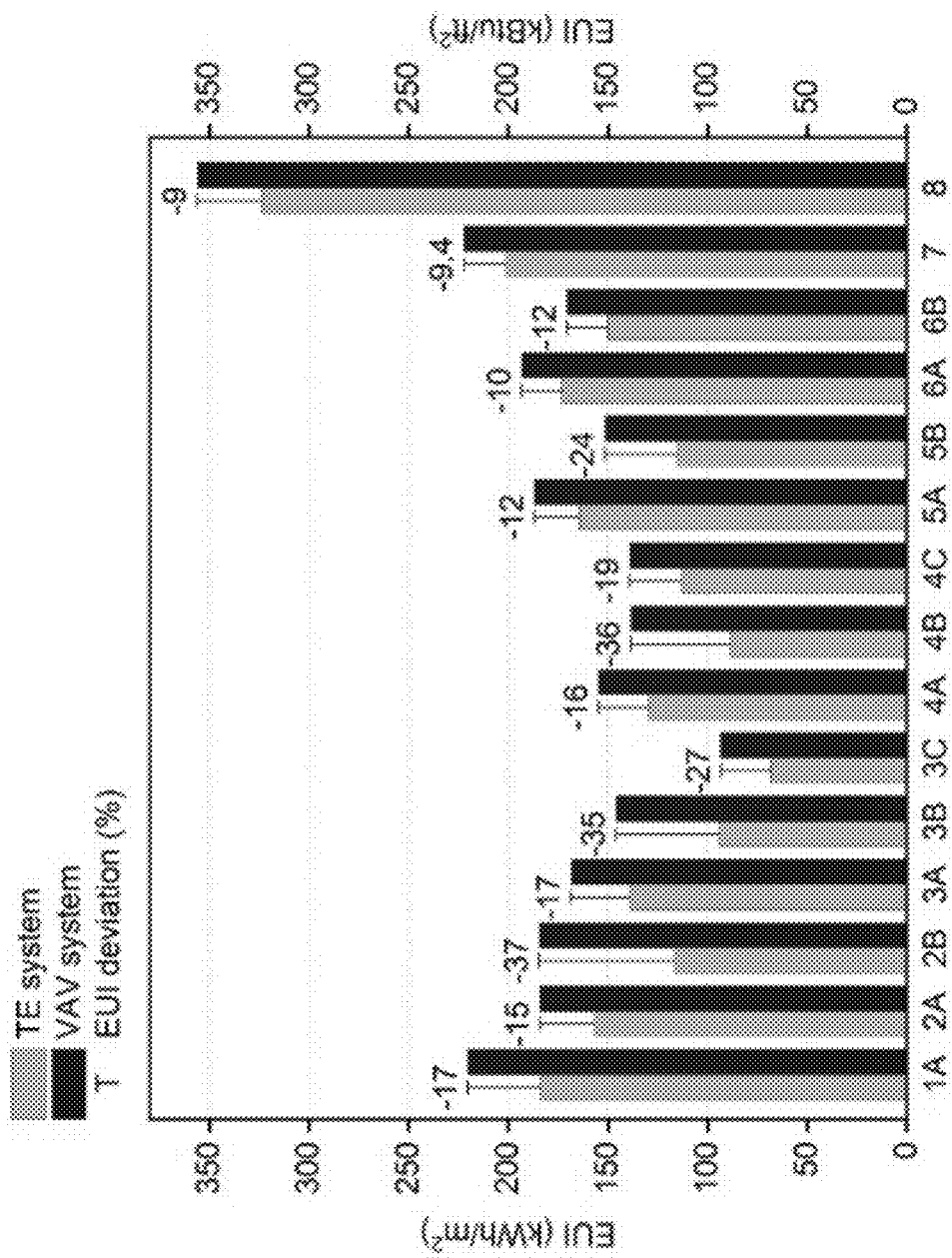
FIG. 14 shows an EUI comparison between the two systems in various climate zones.

Annual energy consumption comparisons of the TE facade vs. VAV systems are illustrated in FIG. 13. Changes in energy usage (i.e., HVAC auxiliary, electricity, fuel consumption) between the two systems are shown. Considering the variation in weather conditions, moving from climate zone 1A to 8, electricity use for cooling significantly decreased, while consumed fuel for heating purposes remarkably increased. Unsurprisingly, total energy use in climate zone 8 (subarctic), due to the significant increase in heating loads, and consequently, fuel consumption, was significantly higher than other climate zones. In FIG. 14, deviations in Energy Usage Intensities (EUIs) between the two systems in the selected climate zones are shown. For this purpose, VAV's EUI was selected as the baseline, with the objective to compare energy performance of the innovative TE system against that of the conventional HVAC system. Results of the EUI comparison showed that, regardless of climate zones, EUI deviations were always negative, indicating improved energy performance when TE system was used.

Conclusion for Example 1

The results of the current and previous research indicated that TE materials are promising active components that can be used in facade assemblies for localized heating and cooling purposes. TE system is an independent system that solely operates based on the temperature differences between the internal and external environments, containing no moving parts or harmful substances. Utilizing the temperature differences, TEs can warm up in heating mode and absorb heat in cooling mode. Compared to the conventional HVAC systems, maintenance of TE systems is easier due to the modularity of their components. Moreover, occupants of each room within the same building can use the system based on their personal preferences.

Energy modeling results, performed for various climate zones, showed reduction in energy use and improved performance of TE systems, compared to conventional VAV system. It was concluded that TE system was more energy efficient in all climate zones and conditions, compared to the VAV system. Regardless of the climate zones, monthly and annual energy usage (i.e., electricity, fuel, and HVAC auxiliary) of the TE facade system was lower than that of VAV system.

Example 2

According to a second example, the embodiments of the thermoelectric (TE) facade systems shown in the companying figures and discussed in the above disclosure (hereinafter referred to generally as the disclosed facade systems or a TE system or a TE facade, where TE means thermoelectric cooler) were considered in a whole building and simulations were performed. The following disclosure presents results of a research study that focuses on understanding energy performance of the facade systems that integrate thermoelectric materials (TEs). TEs are active materials that can produce a temperature gradient when electricity is applied, exploiting the Peltier effect, or can generate a voltage when exposed to a temperature gradient, utilizing the Seebeck effect.

This example considered a commercial office building and analyzed integration of the facade systems to provide localized heating and cooling. The main objective of the study was to compare energy performance of these the facade systems to conventional HVAC systems. The inventors were motivated in part to determine whether TEs have inferior coefficient of performance compared to conventional building-scale HVAC systems due to the small size of TE modules. A baseline four-story office building with an area of 20,000 ft2 was developed in IDA ICE software program. Two different models were developed—one representing conventional HVAC system typically used in commercial buildings (VAV system), and one representing two systems, where the perimeter zone would integrate thermoelectric facades and the core would employ VAV system. Simulations were performed for fifteen climate zones in the U.S., investigating TE and VAV's energy performance in various weather conditions. Therefore, 30 energy models were developed and simulated. Simulation results showed that energy consumption of a commercial office with integrated thermoelectric facades would be lower than conventional VAV system for all climate zones, with higher energy savings in colder climates because TEs act as heat pumps in heating mode, delivering higher efficiency.

Research Objectives and Methods for Example 2

The goal of research supporting the second example was to investigate energy performance of the active facade systems. The objectives were:
To investigate energy performance of TE facade systems in various climatic conditions (applied to commercial office buildings) and
To compare energy usage of these active facade systems to conventional HVAC systems.

This study was conducted by modeling energy usage of a commercial office building, using IDA ICE software program. A baseline, rectangular four-story office building with an area of 20,000 ft2 (1,859 m2) and Window-to-Wall Ratio (WTW) of 40% was considered. Two different models were used for the study—one representing conventional HVAC system typically used in commercial buildings (VAV system), and one representing two systems, where the perimeter zone would integrate thermoelectric facades and the core would employ VAV system. For this scenario, the assumption was that the core area with the VAV system would be located 33 ft (10 m) from two short exterior walls and 16 ft (5 m) distant from the other two exterior walls. The exterior walls integrated TE facade systems for the perimeter zone (15% of exterior walls), which were modeled as radiant systems. The table below shows constant inputs that were used in the study for building systems and materials, operating schedules, lighting, and equipment loads.

| Constant inputs used for energy modeling | |
|---|---|
| Type | Inputs |
| Exterior solid walls | Brick cavity wall with concrete back-up wall and insulation U-Value = 0.065 Btu/hft2F (0.372 W/m2K) |
| Glazing system | Double insulated glazing unit, clear U-Value = 0.51 Btu/hft2F (2.9 W/m2K) SHGC = 0.76 VT = 0.81 |
| Window-to-wall ratio | 40% |
| Interior walls | Partitions U-Value = 0.3 Btu/hft2F (1.7 W/m2K) |
| Ground floor | Concrete slab, insulated U-Value = 0.041 Btu/hft2F (0.23 W/m2K) |
| Other floors | Concrete, 6 in (150 mm) U-Value = 0.42 Btu/hft2F (2.39 W/m2K) |
| Roof | Concrete, insulated U-Value = 0.03 Btu/hft2F (0.17 W/m2K) |
| Schedule | 8 am to 5 pm (weekdays) |
| Number of occupants | 50 |
| Equipment load | 3.75 kW |
| Lighting load | 5 kW |

Simulations were performed for 15 climate zones in the U.S., investigating TE and VAV's energy performance in various weather conditions. The table below shows considered climate zones. Therefore, 30 energy models were developed and simulated.

Climate zones and representative cities used for the energy modeling.

| | Climate zone | City | Zone | Region |
|---|---|---|---|---|
| 1 | 1A | Miami, FL | Very hot | Moist |
| 2 | 2A | Houston, TX | Hot | Moist |
| 3 | 2B | Phoenix, AZ | Hot | Dry |
| 4 | 3A | Memphis, TN | Warm | Moist |
| 5 | 3B | El Paso, TX | Warm | Dry |
| 6 | 3C | San Francisco, CA | Warm | Marine |
| 7 | 4A | Baltimore, MD | Mixed | Moist |
| 8 | 4B | Albuquerque, NM | Mixed | Dry |
| 9 | 4C | Salem, OR | Mixed | Marine |
| 10 | 5A | Chicago, IL | Cool | Moist |
| 11 | 5B | Boise, ID | Cool | Dry |
| 12 | 6A | Burlington, VT | Cold | Moist |
| 13 | 6B | Helena, MT | Cold | Dry |
| 14 | 7 | Duluth, MN | Very cold | |
| 15 | 8 | Fairbanks, AK | Subarctic | |

The existing energy modeling software programs do not have the capability to model and simulate TE facade system, therefore, a representative system was used as a replacement for all energy models. To accurately model and capture TE system's impacts on the energy performance, an electric radiator, with characteristics that most closely matched that of the TE system, was used. This included assigning a certain area to the radiator and calculating its rated input power based on the climate conditions. The assigned area for each electric radiator was set as 15 ft2 (1.4 m2). Given that the TE system's performance and output depend on the temperature difference between the building internal and external environments, this was separately calculated for each climate zone and used for modeling the energy performance of TE system. The table below shows power rating calculations for various climate zones. This also implies that the efficiency of TE modules increases as the difference between the interior and exterior temperature increases. This data was used to assign input power ratings for the radiant system. TE facades were modeled as radiant systems, and conventional HVAC system considered single zone VAV system.

Results for Example 2

The results included monthly and annual energy performance, as well as Energy Usage Intensity (EUI) for each analyzed climate zone. Monthly energy data combined various energy loads, including lighting, equipment, HVAC auxiliary, electric cooling, electric heating, and fuel heating. Given that lighting and equipment types and schedules were kept identical in all models, these two categories were excluded from data comparisons. Therefore, in the comparative analysis of the energy performance, HVAC auxiliary, electric cooling, and fuel heating were the only energy sources taken into consideration.

Figure 15:
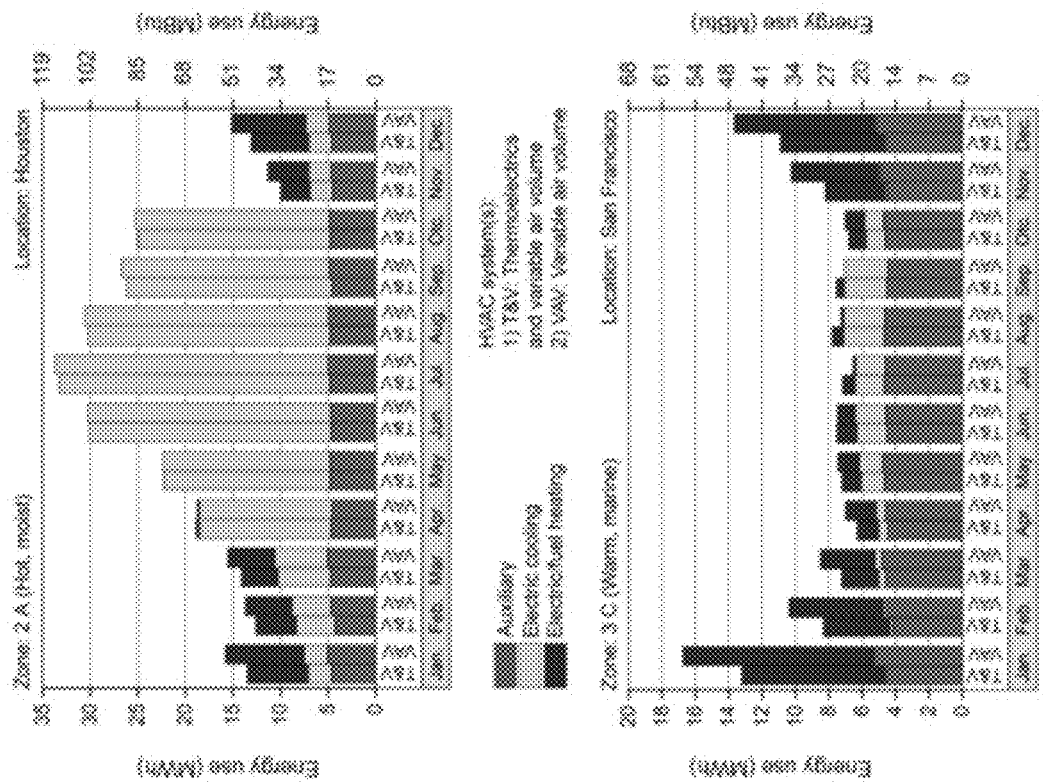
FIG. 15 shows a comparison of monthly energy use in climate zones 2A and 3C.

The general trend of monthly energy use comparisons of TE vs. VAV systems was summarized by merging the fifteen climate zones into three large categories: very hot to warm (1A to 3C), mixed (4A to 4C), and cool to subarctic (5A to 8). From each category, two zones/locations were selected to represent energy performance differences, as shown in FIGS. 15 to 18. In FIG. 15, monthly energy use comparisons between the two systems, considering climate zones 2A (Houston) and 3C (San Francisco), are illustrated.

Monthly energy use for the conventional system was always higher than that of TE system. Considering climate zone and location, higher amount of energy was used for cooling purposes, compared to heating. Heating would only be used during the coldest months of the year, while electric cooling was mostly used during summer and fall months.

Figure 16:
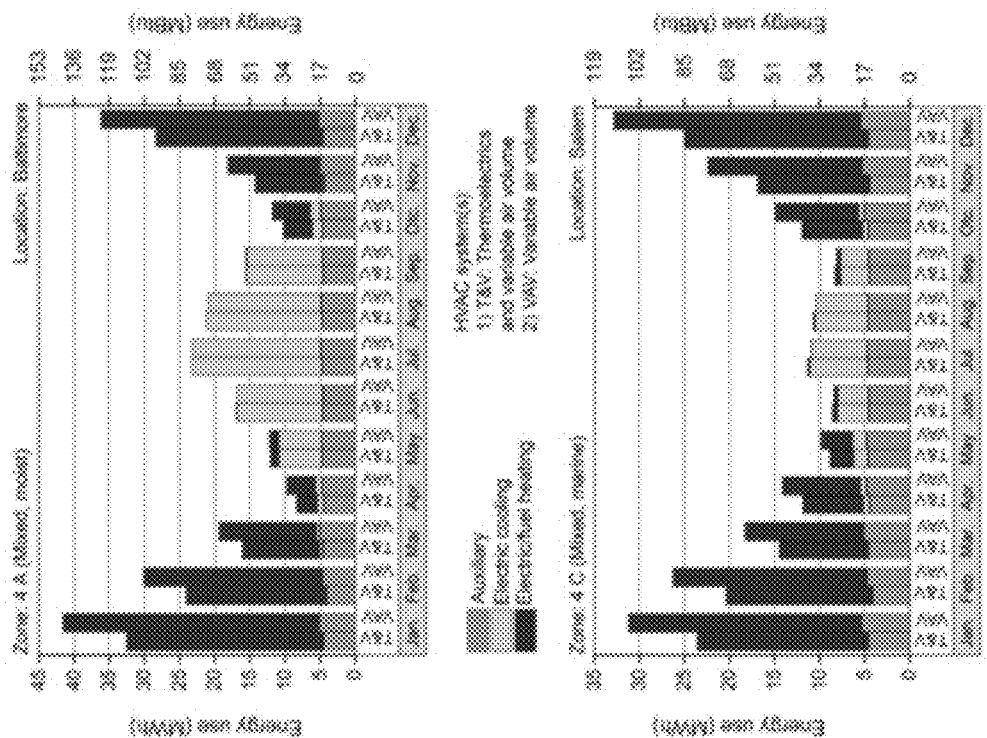
FIG. 16 shows monthly energy use in climate zones 4A and 4C.

FIG. 16 shows results for climate zones 4A (Baltimore) and 4C (Salem). Given that these locations have colder climate, compared to 2A and 3C zones, heating loads were higher and cooling loads were lower.

Figure 17:
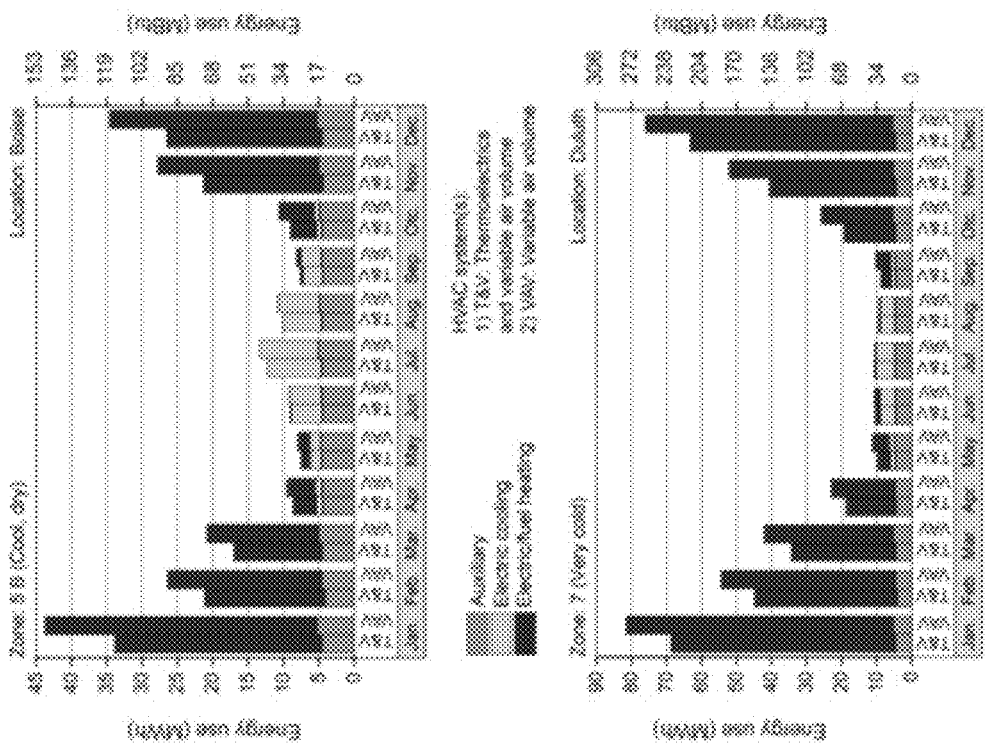
FIG. 17 shows monthly energy use in climate zones 5B and 7.

FIG. 17 shows monthly energy use for climate zones 5B (Boise) and 7 (Duluth). TE system exhibited improved energy performance, specifically during coldest months, such as January, February, March, November, and December. In this category, there was a significant reduction in monthly cooling for both systems compared to other climate zones, where most of the loads were eliminated except during the hottest months of the year. Moreover, heating loads were higher than for the other two climate categories, due to the weather conditions.

Temperature differences between the interior and exterior environments for considered climate zones, and associated power rating values for TE system.

| | Climate zone | Indoor temperature °F. (°C.) | Maximum outdoor temperature °F. (°C.) | Minimum outdoor temperature °F. (°C.) | Mean delta temperature °F. (°C.) | Power rating per module (W) | Total power rating (W) |
|---|---|---|---|---|---|---|---|
| 1 | 1A | 70 (21) | 96 (36) | 41 (5) | 59 (15) | 80 | 2,160 |
| 2 | 2A | 70 (21) | 96 (36) | 33 (1) | 64 (18) | 78 | 2,106 |
| 3 | 2B | 70 (21) | 111 (44) | 36 (2) | 70 (21) | 75 | 2,025 |
| 4 | 3A | 70 (21) | 101 (38) | 11 (−12) | 77 (25) | 70 | 1,890 |
| 5 | 3B | 70 (21) | 102 (39) | 22 (−6) | 73 (23) | 75 | 2,025 |
| 6 | 3C | 70 (21) | 91 (33) | 36 (2) | 59 (15) | 80 | 2,160 |
| 7 | 4A | 70 (21) | 95 (35) | 6 (−14) | 77 (25) | 70 | 1,890 |
| 8 | 4B | 70 (21) | 101 (38) | 15 (−9) | 76 (24) | 70 | 1,890 |
| 9 | 4C | 70 (21) | 101 (38) | 13 (−11) | 77 (25) | 70 | 1,890 |
| 10 | 5A | 70 (21) | 95 (35) | −9 (−23) | 84 (29) | 63 | 1,701 |
| 11 | 5B | 70 (21) | 101 (38) | 3 (−16) | 81 (27) | 65 | 1,755 |
| 12 | 6A | 70 (21) | 99 (37) | −18 (−28) | 90 (33) | 55 | 1,485 |
| 13 | 6B | 70 (21) | 95 (35) | −12 (−24) | 86 (30) | 60 | 1,620 |
| 14 | 7 | 70 (21) | 91 (33) | −23 (−31) | 89 (32) | 57 | 1,539 |
| 15 | 8 | 70 (21) | 86 (30) | −37 (−38) | 94 (34) | 55 | 1,485 |

Figure 18:
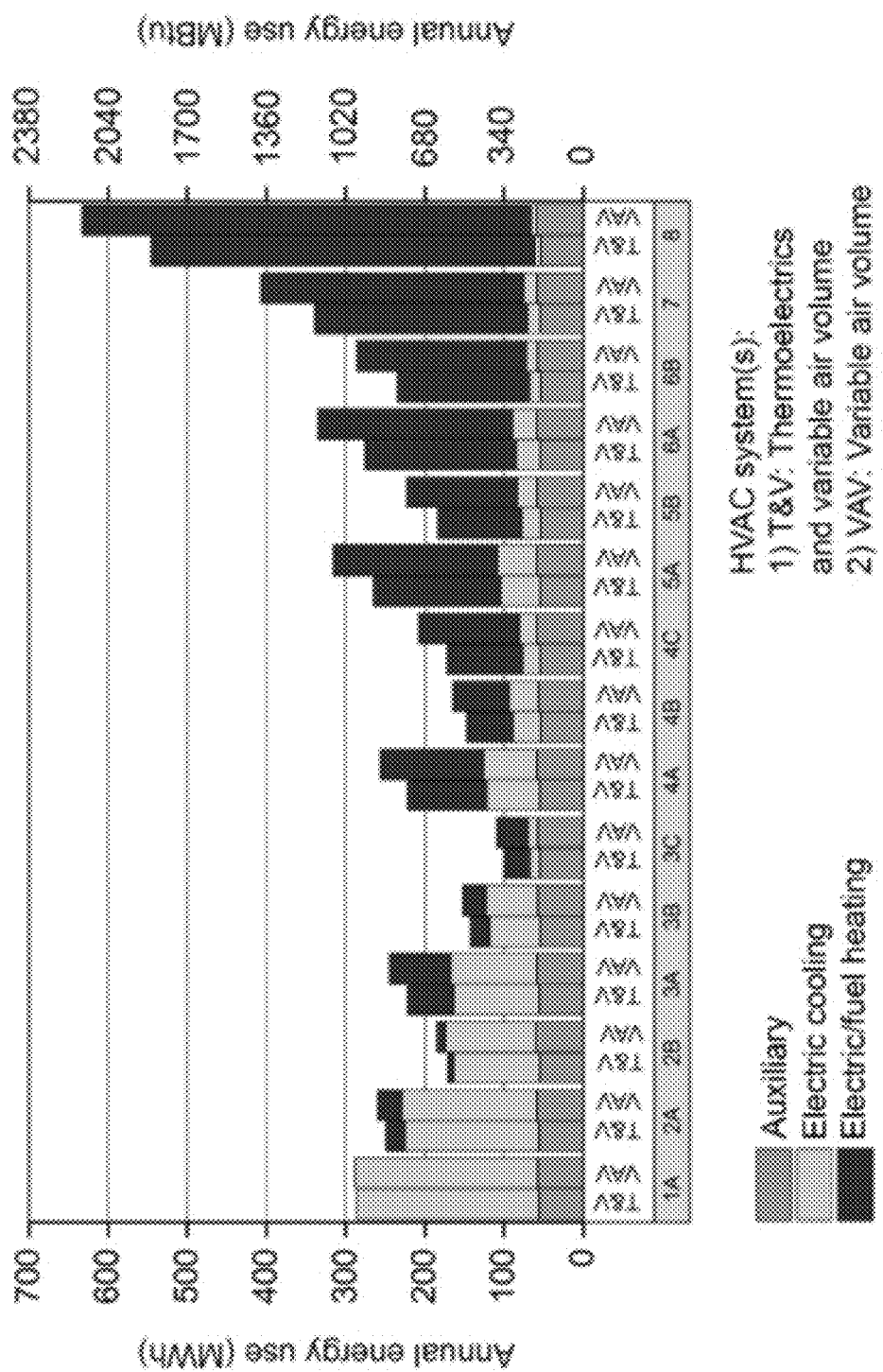
FIG. 18 shows a comparison of annual energy consumption (TE facade system vs. VAV) for all investigated climate zones.

Comparison of annual energy consumption data for all climate zones is shown in FIG. 18. Changes in energy usage (heating and cooling loads) for each system are shown, based on variations in weather conditions. Moving from climate zones 1A to 8, cooling decreased, while fuel consumption for heating significantly increased. Unsurprisingly, total energy use in climate zone 8 (subarctic), due to the significant increase in heating loads and fuel consumption, was much higher than for other cases.

Figure 19:
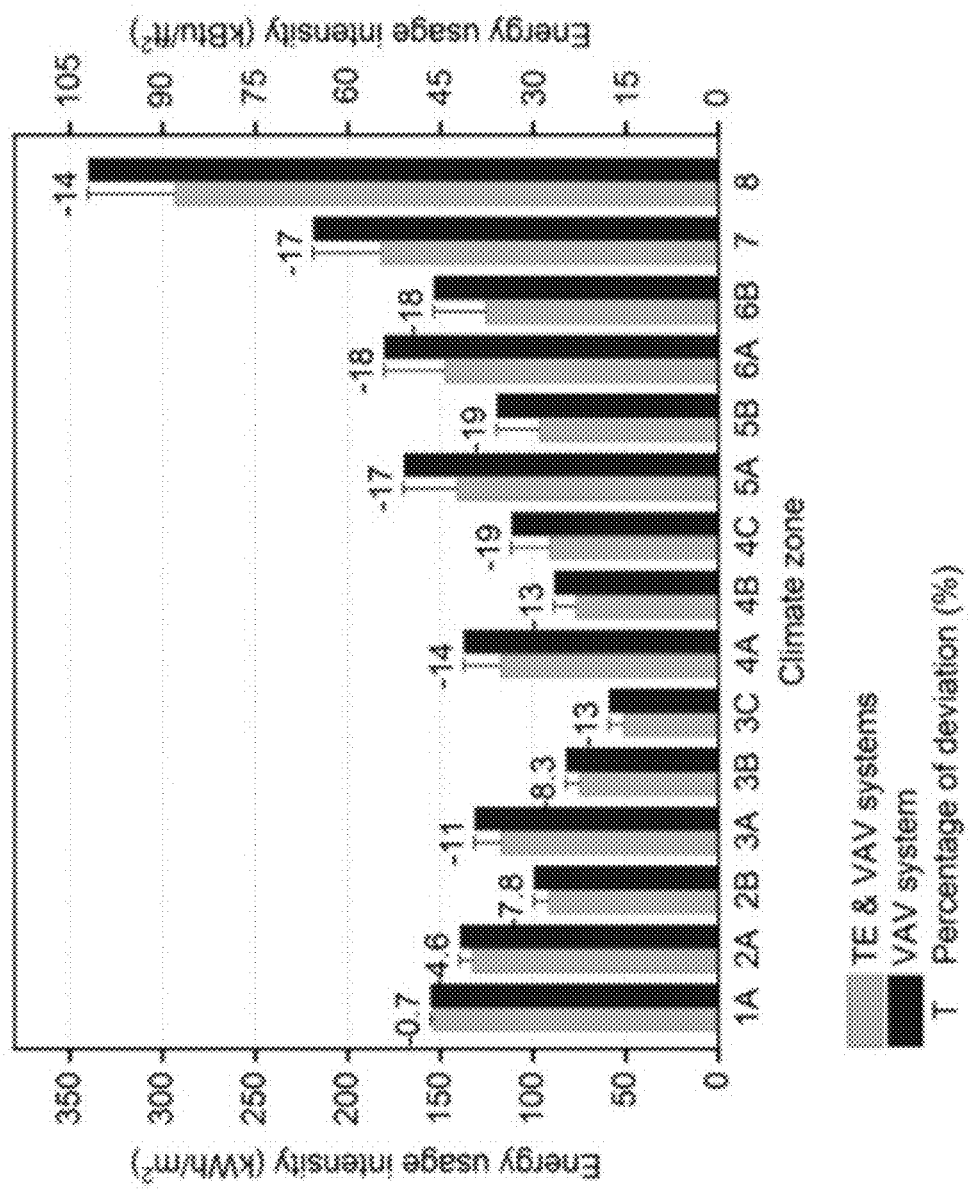
FIG. 19 shows an EUI comparison and deviation (TE facade system vs. VAV).

FIG. 19 indicates deviations in EUI. The reason for selecting VAV system as the baseline was to compare energy performance of the active TE facade system to a conventional HVAC system commonly found in office buildings. Results showed that regardless of climate conditions, EUI deviations were always negative, indicating energy savings achieved by the TE facade system.

Discussion and Conclusions for Example 2

Results of this research indicated that TE materials are promising intelligent components that can be used in active facade assemblies for heating and cooling purposes, controlling buildings' interior environment.

However, separate ventilation system would still be needed for interior spaces, which cannot be provided by the stand-alone facade-integrated TEs. Maintenance of TE systems is easier compared to the conventional HVAC systems because they can be treated as individual components, with no need to shut down the whole system for repairs. They can also be individually replaced at modest cost compared to replacing the whole-building HVAC system, allowing for continuous upgrades. Furthermore, they can be used as a personalized system where occupants of each room within the same building can use it based on personal preferences, which may be highly advantageous in environments with strict or highly varying needs, such as hospitals where surgery might require cooling while neonatal rooms require heating. These systems are also ideal for retrofitting existing buildings for energy efficiency improvements, since they can be installed as modular, non-invasive facade elements. This is particularly advantageous in historic buildings where energy efficiency is poor but piping or ductwork could impact the historic character.

Energy modeling results, performed for various climate zones, showed reduction in energy consumption and improved performance of active facade systems with integrated TE materials, compared to conventional HVAC systems. The developed systems show a promising direction for new, active facades that react to environmental conditions, and generate energy for buildings' operation.

Sensor data identified herein may be obtained and processed separately, or simultaneously and stitched together, or a combination thereof, and may be processed in a raw or complied form. The sensor data may be processed on the sensor (e.g. via edge computing), by controllers identified or implicated herein, on a cloud service, or by a combination of one or more of these computing systems. The senor may communicate the data via wired or wireless transmission lines, applying one or more protocols as indicated below.

Wireless connections may apply protocols that include local area network (LAN, or WLAN for wireless LAN) protocols. LAN protocols include WiFi technology, based on the Section 802.11 standards from the Institute of Electrical and Electronics Engineers (IEEE). Other applicable protocols include Low Power WAN (LPWAN), which is a wireless wide area network (WAN) designed to allow long-range communications at a low bit rates, to enable end devices to operate for extended periods of time (years) using battery power. Long Range WAN (LoRaWAN) is one type of LPWAN maintained by the LoRa Alliance, and is a media access control (MAC) layer protocol for transferring management and application messages between a network server and application server, respectively. LAN and WAN protocols may be generally considered TCP/IP protocols (transmission control protocol/Internet protocol), used to govern the connection of computer systems to the Internet. Wireless connections may also apply protocols that include private area network (PAN) protocols. PAN protocols include, for example, Bluetooth Low Energy (BTLE), which is a wireless technology standard designed and marketed by the Bluetooth Special Interest Group (SIG) for exchanging data over short distances using short-wavelength radio waves. PAN protocols also include Zigbee, a technology based on Section 802.15.4 protocols from the IEEE, representing a suite of high-level communication protocols used to create personal area networks with small, low-power digital radios for low-power low-bandwidth needs. Such protocols also include Z-Wave, which is a wireless communications protocol supported by the Z-Wave Alliance that uses a mesh network, applying low-energy radio waves to communicate between devices such as appliances, allowing for wireless control of the same.

Wireless connections may also include radio-frequency identification (RFID) technology, used for communicating with an integrated chip (IC), e.g., on an RFID smartcard. In addition, Sub-1 Ghz RF equipment operates in the ISM (industrial, scientific and medical) spectrum bands below Sub 1 Ghz—typically in the 769-935 MHz, 315 Mhz and the 468 Mhz frequency range. This spectrum band below 1 Ghz is particularly useful for RF IOT (internet of things) applications. The Internet of things (IoT) describes the network of physical objects—"things"—that are embedded with sensors, software, and other technologies for the purpose of connecting and exchanging data with other devices and systems over the Internet. Other LPWAN-IOT technologies include narrowband internet of things (NB-IOT) and Category M1 internet of things (Cat M1-IOT). Wireless communications for the disclosed systems may include cellular, e.g. 2G/3G/4G (etc.). Other wireless platforms based on RFID technologies include Near-Field-Communication (NFC), which is a set of communication protocols for low-speed communications, e.g., to exchange date between electronic devices over a short distance. NFC standards are defined by the ISO/IEC (defined below), the NFC Forum and the GSMA (Global System for Mobile Communications) group. The above is not intended on limiting the scope of applicable wireless technologies.

Wired connections may include connections (cables/interfaces) under RS (recommended standard)-422, also known as the TIA/EIA-422, which is a technical standard supported by the Telecommunications Industry Association (TIA) and which originated by the Electronic Industries Alliance (EIA) that specifies electrical characteristics of a digital signaling circuit. Wired connections may also include (cables/interfaces) under the RS-232 standard for serial communication transmission of data, which formally defines signals connecting between a DTE (data terminal equipment) such as a computer terminal, and a DCE (data circuit-terminating equipment or data communication equipment), such as a modem. Wired connections may also include connections (cables/interfaces) under the Modbus serial communications protocol, managed by the Modbus Organization. Modbus is a master/slave protocol designed for use with its programmable logic controllers (PLCs) and which is a commonly available means of connecting industrial electronic devices. Wireless connections may also include connectors (cables/interfaces) under the PROFibus (Process Field Bus) standard managed by PROFIBUS & PROFINET International (PI). PROFibus which is a standard for fieldbus communication in automation technology, openly published as part of IEC (International Electrotechnical Commission) 61158. Wired communications may also be over a Controller Area Network (CAN) bus. A CAN is a vehicle bus standard that allow microcontrollers and devices to communicate with each other in applications without a host computer. CAN is a message-based protocol released by the International Organization for Standards (ISO). The above is not intended on limiting the scope of applicable wired technologies.

When data is transmitted over a network between end processors as identified herein, the data may be transmitted in raw form or may be processed in whole or part at any one of the end processors or an intermediate processor, e.g., at a cloud service (e.g. where at least a portion of the transmission path is wireless) or other processor. The data may be parsed at any one of the processors, partially or completely processed or complied, and may then be stitched together or maintained as separate packets of information. Each processor or controller identified herein may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory identified herein may be but is not limited to a random access memory (RAM), read only memory (ROM), or other electronic, optical, magnetic or any other computer readable medium.

The controller may further include, in addition to a processor and non-volatile memory, one or more input and/or output (I/O) device interface(s) that are communicatively coupled via an onboard (local) interface to communicate among other devices. The onboard interface may include, for example but not limited to, an onboard system bus, including a control bus (for inter-device communications), an address bus (for physical addressing) and a data bus (for transferring data). That is, the system bus may enable the electronic communications between the processor, memory and I/O connections. The I/O connections may also include wired connections and/or wireless connections identified herein. The onboard interface may have additional elements, which are omitted for simplicity, such as controllers, buffers (caches), drivers, repeaters, and receivers to enable electronic communications. The memory may execute programs, access data, or lookup charts, or a combination of each, in furtherance of its processing, all of which may be stored in advance or received during execution of its processes by other computing devices, e.g., via a cloud service or other network connection identified herein with other processors.

Embodiments can be in the form of processor-implemented processes and devices for practicing those processes, such as processor. Embodiments can also be in the form of computer code based modules, e.g., computer program code (e.g., computer program product) containing instructions embodied in tangible media (e.g., non-transitory computer readable medium), such as floppy diskettes, CD ROMs, hard drives, on processor registers as firmware, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the exemplary embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An architectural structure, comprising:
   a wall of a room of the architectural structure; and a panel integrated into the wall, wherein the panel comprises thermoelectric components (TECs) arranged as a TEC grid, thereby defining a radiant panel,
   wherein: the TECs, of the TEC grid, are thermally coupled to a common heat sink formed in part by an exterior surface of the wall; and the wall defines a wall surface area, the panel defines a panel surface area, and the panel surface area is between 5% and 20% of the wall surface area,
   wherein the wall defines a panel aperture, and the panel is disposed within the panel aperture, wherein the wall defines a wall interior surface and a wall exterior surface that are depthwise spaced apart from each other, wherein the panel defines a panel exterior surface and a panel interior surface that are depthwise spaced apart from each other,
   wherein: the wall exterior and interior surfaces and the panel exterior and interior surfaces are parallel to each other; and the panel exterior surface is flush with, or continuous with, the wall exterior surface to define the common heat sink for the TEC grid, and
   wherein:
   a panel depth of the panel is greater than a wall depth of the wall so that the panel interior surface is depthwise spaced apart from the wall interior surface.

2. A method of thermally controlling a room of an architectural structure, comprising:
  determining, by a thermostat, that a room activation condition has been reached; and
  activating, by the thermostat, the panel of claim 1.

3. An architectural structure, comprising:
  a wall of a room of the architectural structure; and a panel integrated into the wall, wherein the panel comprises thermoelectric components (TECs) arranged as a TEC grid, thereby defining a radiant panel,
  wherein: the TECs, of the TEC grid, are thermally coupled to a common heat sink formed in part by an exterior surface of the wall; and the wall defines a wall surface area, the panel defines a panel surface area, and the panel surface area is between 5% and 20% of the wall surface area,
  wherein the wall defines a panel aperture, and the panel is disposed within the panel aperture, wherein the wall defines a wall interior surface and a wall exterior surface that are depthwise spaced apart from each other, wherein the panel defines a panel exterior surface and a panel interior surface that are depthwise spaced apart from each other,
  wherein: the wall exterior and interior surfaces and the panel exterior and interior surfaces are parallel to each other; and the panel exterior surface is flush with, or continuous with, the wall exterior surface to define the common heat sink for the TEC grid, and
  wherein:
  the panel defines a panel sandwich structure formed of a plurality of panel layers that are parallel to each other, wherein the TEC grid is a center panel layer located at or near a panel depthwise center of the panel, and
  the plurality of panel layers are defined by:
    the panel exterior surface and the panel interior surface, which define respective first and second heat sink panels;
    first and second sets of heat fins, which are respectively coupled to the first and second heat sink panels;
    first and second heat fin caps, which are respectively coupled to the first and second sets of heat fins; and
    first and second conductors, which are respectively coupled between the first and second heat fin caps and the TEC grid,
  wherein a thermal conductive circuit is defined between the panel exterior and interior surfaces, the first and second sets of heat fins, and the first and second heat fin caps.

4. A method of thermally controlling a room of an architectural structure, comprising:
  determining, by a thermostat, that a room activation condition has been reached; and
  activating, by the thermostat, the panel of claim 3.

5. The architectural structure of claim 3, wherein:
the TEC grid includes a plurality of rows and columns of the TECs that are spaced apart from each other, wherein the TECs are each thermally connected to each other via the thermal conductive circuit.

6. The architectural structure of claim 3, wherein:
the wall defines a well depthwise center, depthwise between the wall interior surface and the wall exterior surface; and
the TEC grid is aligned with the wall depthwise center.

7. The architectural structure of claim 3, wherein:
the first set of heat fins have a first fin depthwise span; and
the second set of heat fins have a second fin depthwise span that is less than the first fin depthwise span.

8. The architectural structure of claim 3, wherein:
the first and second heat sink panels are, respectively, first and second rainscreens formed of aluminum; and
the first and second sets of heat fins are formed of aluminum.

9. The architectural structure of claim 3, wherein:
the wall defines a wall sandwich structure formed of a plurality of wall layers that are parallel to each other, and the plurality of wall layers are defined by:
  the wall interior surface, which is a first sheathing layer;
  the wall exterior surface, which is at least in part formed of the same material as the panel exterior surface, and at least in part defines the common heat sink for the TEC grid;
  a first insulation layer, which is disposed against the wall interior surface;
  a second sheathing layer, which is disposed against the first insulation layer; and
  a second insulation layer, which is disposed against the second sheathing layer, wherein:
  a first airgap layer is defined between the wall interior surface and the first insulation layer; and
  a second airgap layer is defined between the second insulation layer and the wall exterior surface.

10. The architectural structure of claim 9, wherein the first and second sheathing layers are gypsum.

11. The architectural structure of claim 9, comprising:
supports for the wall exterior surface that extend depthwise between the second insulation layer and the wall exterior surface.

12. The architectural structure of claim 9, wherein:
the first insulation layer is batting and the second insulation layer is rigid foam, wherein:
  the first insulation layer has a first insulation layer depth that is substantially three times a second insulation layer depth of the second insulation layer; and
  a second airgap depth defined between the second insulation layer and the wall exterior surface is substantially the same as the second insulation layer depth.

13. The architectural structure of claim 12, wherein:
a third insulation layer surrounds an outer boundary of the panel, depthwise between and extending perpendicularly to the wall exterior and interior surfaces, to thermally isolate the panel from the wall interior surface, the first insulation layer, the second sheathing layer, the second insulation layer, and the first and second airgap layers.

14. The architectural structure of claim 13, wherein:
the third insulation layer is rigid foam having a thickness that is half of the second insulation layer depth.

15. The architectural structure of claim 3, comprising:
a power source, controllable by a thermostat, connected to the first and second conductors to control a heating direction of the TEC grid.

* * * * *